United States Patent
Zhu et al.

(10) Patent No.: US 12,143,305 B2
(45) Date of Patent: Nov. 12, 2024

(54) COMMUNICATION METHOD AND APPARATUS

(71) Applicant: HUAWEI TECHNOLOGIES CO., LTD., Shenzhen (CN)

(72) Inventors: Hualin Zhu, Shanghai (CN); Zhongping Chen, Shanghai (CN); Li Qiang, Beijing (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 17/969,734

(22) Filed: Oct. 20, 2022

(65) Prior Publication Data

US 2023/0043261 A1 Feb. 9, 2023

Related U.S. Application Data

(63) Continuation of application No. PCT/CN2020/086515, filed on Apr. 23, 2020.

(51) Int. Cl.
*H04L 47/2483* (2022.01)
*H04L 47/2408* (2022.01)
(Continued)

(52) U.S. Cl.
CPC ...... *H04L 47/2483* (2013.01); *H04L 47/2408* (2013.01); *H04L 47/32* (2013.01); *H04L 47/805* (2013.01)

(58) Field of Classification Search
None
See application file for complete search history.

(56) References Cited

U.S. PATENT DOCUMENTS

| | | | | |
|---|---|---|---|---|
| 7,411,903 B2* | 8/2008 | Jang | ............ | H04L 47/10 |
| | | | | 714/746 |
| 8,325,638 B2* | 12/2012 | Jin | ............ | H04W 4/20 |
| | | | | 370/310 |

(Continued)

FOREIGN PATENT DOCUMENTS

| | | |
|---|---|---|
| CN | 109076399 A | 12/2018 |
| CN | 110166379 A | 8/2019 |

(Continued)

OTHER PUBLICATIONS

3GPP TS 23.501 V16.4.0 (Mar. 2020), 3rd Generation Partnership Project; Technical Specification Group Services and System Aspects; System architecture for the 5G System (5GS); Stage 2(Release 16), 430 pages.

(Continued)

*Primary Examiner* — Eunsook Choi
(74) *Attorney, Agent, or Firm* — HAUPTMAN HAM, LLP

(57) ABSTRACT

A communication method and apparatus. A user plane network element perform refined differentiated processing on different data packets to adapt to and meet different user requirements and network conditions. A first user plane network element receives a first data packet, where the first data packet carries first indication information. The first user plane network element processes the first data packet based on the first indication information. The first indication information includes one or more of the following: synchronous transmission indication information, packet discard indication information, data type indication information, charging indication information, statistics indication information, or priority indication information.

20 Claims, 17 Drawing Sheets

(51) Int. Cl.
  *H04L 47/32* (2022.01)
  *H04L 47/80* (2022.01)

(56) References Cited

U.S. PATENT DOCUMENTS

| | | | |
|---|---|---|---|
| 10,341,126 B2* | 7/2019 | Stammers | H04L 45/38 |
| 10,448,268 B1* | 10/2019 | Jaya | H04W 76/19 |
| 11,751,096 B2* | 9/2023 | Liu | H04L 47/11 370/235 |
| 2003/0067878 A1* | 4/2003 | Zboril | H04L 47/10 370/235 |
| 2016/0337672 A1 | 11/2016 | Lee et al. | |
| 2021/0392090 A1* | 12/2021 | Laselva | H04L 1/08 |

FOREIGN PATENT DOCUMENTS

| | | |
|---|---|---|
| CN | 110691370 A | 1/2020 |
| JP | 2004180192 A | 6/2004 |
| JP | 2015167313 A | 9/2015 |
| JP | 2020509663 A | 3/2020 |
| WO | 2016049926 A1 | 4/2016 |
| WO | 2018142021 A1 | 8/2018 |
| WO | 2019095278 A1 | 5/2019 |

OTHER PUBLICATIONS

3GPP TS 29.244 V16.3.1 (Apr. 2020), 3rd Generation Partnership Project; Technical Specification Group Core Network and Terminals; Interface between the Control Plane and the User Plane Nodes; Stage 3(Release 16), 297 pages.

3GPP TS 23.246 V16.1.0 (Sep. 2019), 3rd Generation Partnership Project; Technical Specification Group Services and System Aspects; Multimedia Broadcast/Multicast Service (MBMS); Architecture and functional description(Release 16), 77 pages.

International Search Report issued in corresponding International Application No. PCT/CN2020/086515, dated Jan. 29, 2021, pp. 1-9.

Samsung, QoS parameter—Packet Delay Budget. SA WG2 Meeting #116, Jul. 11-15, 2016, Vienna, Austria, S2-163704, 9 pages.

Extended European Search Report issued in corresponding European Application No. 20932636.2, dated Apr. 20, 2023, pp. 1-9.

Japanese Office Action issued in corresponding Japanese Application No. 2022-564408, dated Oct. 3, 2023, pp. 1-17.

* cited by examiner

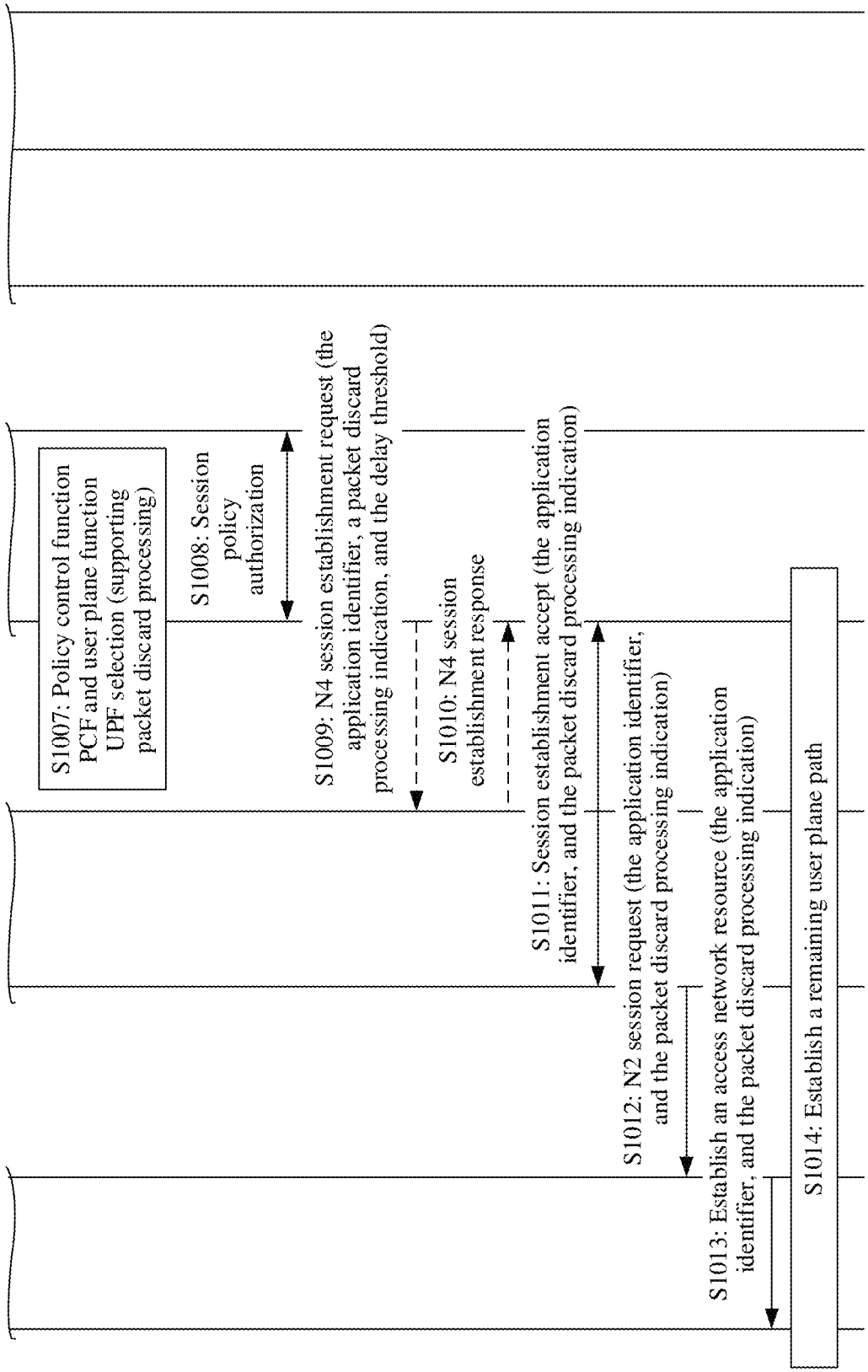

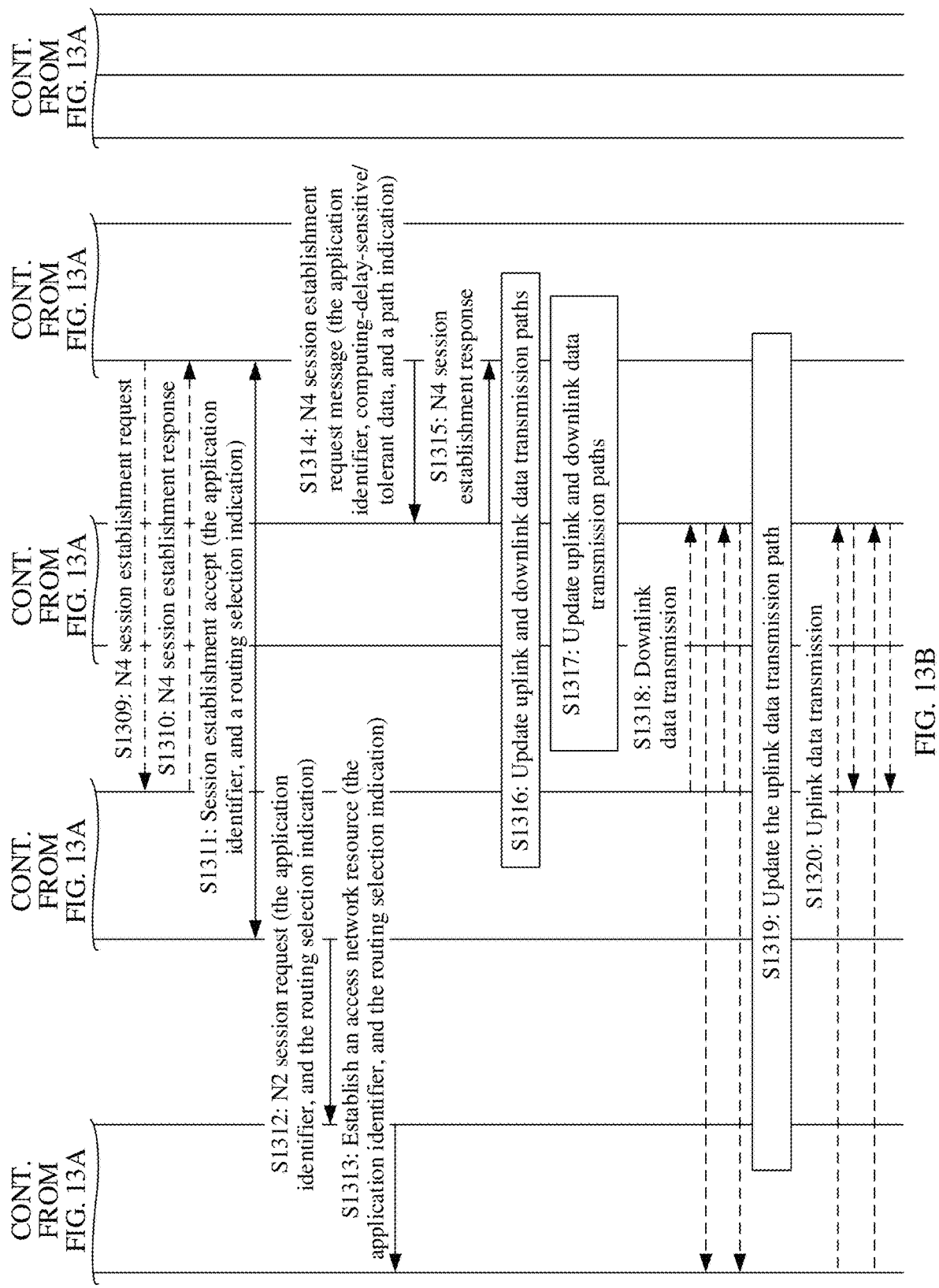

COMMUNICATION METHOD AND APPARATUS

CROSS-REFERENCE TO RELATED APPLICATIONS

This application is a continuation of International Application No. PCT/CN2020/086515, filed on Apr. 23, 2020, the disclosure of which is hereby incorporated by reference in its entirety.

BACKGROUND

After a protocol data unit (PDU) session is established, a user plane network element views a quintuple of a received data packet, matches a data flow to which the data packet belongs, and then processes the data packet based on a parameter required for data packet processing. However, the user plane network element identifies, by using the quintuple carried in the data packet, a service flow to which the data packet belongs, and performs a unified operation on the data packet of the service flow. Because differentiated processing cannot be performed on different data packets in one service flow, it is difficult to adapt to and meet a temporary requirement change of a user or a network condition change.

SUMMARY

Embodiments described herein provide a communication method and apparatus, to resolve a problem that in response to performing a unified operation on a data flow, a user plane network element cannot meet a temporary change of a user, a network condition change, or the like.

According to a first aspect, at least one embodiment provides a communication method. The method includes: receiving a first data packet, where the first data packet carries first indication information; and processing the first data packet based on the first indication information, where the first indication information includes one or more of the following: synchronous transmission indication information, packet discard indication information, data type indication information, charging indication information, statistics indication information, or priority indication information.

The communication method provided in at least one embodiment is applied to a first user plane network element, and the first user plane network element is a UPF network element and/or a (R)AN. In at least one embodiment, refined differentiated processing is performed, on a user plane network element, on different data packets at a granularity of a data packet by carrying indication information in the data packet. Compared with data processing performed at a granularity of a data flow, this is better adapted to and meets different user requirements, a network condition change, and the like.

In at least one embodiment, the first indication information includes the synchronous transmission indication information. In response to the first data packet being processed based on the first indication information, the first data packet and at least one second data packet is synchronously transmitted, where synchronous transmission indication information carried in the at least one second data packet is associated with the synchronous transmission indication information carried in the first data packet. In this way, synchronous transmission at a packet granularity is implemented.

Optionally, the first data packet is a data packet in a first data flow, and the second data packet is a data packet in a second data flow.

In at least one embodiment, the first indication information includes the packet discard indication information. In response to the first data packet being processed based on the first indication information, the first data packet is discarded based on the packet discard indication information in response to network congestion occurring: or after the first data packet is received, the first data packet is discarded based on the packet discard indication information in response to being identified that transmission duration of the first data packet exceeds a delay threshold, where the delay threshold is received by the first user plane network element from a first control plane network element or the first data packet carries the delay threshold. In this way, packet discard processing at the packet granularity is implemented.

In at least one embodiment, the first indication information includes the data type indication information, the data type indication information indicates a video frame type of the first data packet, and the video frame type includes one or more of the following: an I-frame, a P-frame, or a B-frame. Quality of service QoS guarantee provided by the first user plane network element for a data packet whose video frame type is the I-frame is higher than QoS guarantee provided for a data packet whose video frame type is the P-frame or the B-frame. In this way, QoS guarantee at the packet granularity is implemented.

In at least one embodiment, the first indication information includes the charging indication information. In response to the first data packet being processed based on the first indication information, a charging rule indicated by the charging indication information is executed for the first data packet. In this way, charging or charging-free at the packet granularity is implemented.

In at least one embodiment, the first indication information includes the statistics indication information. In response to the first data packet being processed based on the first indication information, a statistics rule indicated by the statistics indication information is executed for the first data packet. In this way, statistics or statistics-free at the packet granularity is implemented.

In at least one embodiment, the first indication information includes the priority indication information, and the priority indication information includes a high priority. In response to the first data packet being processed based on the first indication information, the first data packet is transmitted in response to network congestion occurring: or after the first data packet is received, QoS guarantee of the first data packet is improved in response to being identified that the transmission duration of the first data packet exceeds the delay threshold. In this way, preferential processing at the packet granularity is implemented, for example, preferably transmitting the data packet or improving QoS guarantee of the data packet.

In at least one embodiment, the first data packet includes a first field, the first field includes the first indication information, the first indication information indicates a data packet processing type and/or a parameter required for data processing, and the first field indicates the first user plane network element to process the first data packet. In this implementation, at least one embodiment provides a new data packet format, to adapt to data processing at the packet granularity.

In at least one embodiment, the data packet processing type includes one or more of the following: synchronous transmission, packet discard processing, routing selection, charging or charging-free processing, statistics or statistics-free processing, improving or reducing a priority, or improving or reducing QoS.

In at least one embodiment, before the processing the first data packet based on the first indication information, first configuration information from the first control plane network element is further received, where the first configuration information includes one or more of the following: the synchronous transmission indication information, the packet discard indication information, the data type indication information, the charging indication information, the statistics indication information, or the priority indication information.

In response to the first data packet being processed based on the first indication information, in response to a data packet processing type indicated by the first indication information being associated with a data packet processing type indicated by the first configuration information, the first data packet is processed based on the first indication information.

In at least one embodiment, the first configuration information includes the synchronous transmission indication information, and a first synchronous transmission identifier and/or a synchronous transmission precision information is further received, where the first synchronous transmission identifier indicates the first user plane network element to perform synchronous transmission on a data packet that carries a synchronous transmission identifier associated with the first synchronous transmission identifier.

In at least one embodiment, the first indication information includes the synchronous transmission indication information, the first data packet is a data packet generated by an access network element by adding the synchronous transmission indication information to a second data packet, the second data packet comes from a terminal device or a server, and the second data packet carries a second synchronous transmission identifier.

According to a second aspect, at least one embodiment provides a communication method. The method includes: generating a first data packet, where the first data packet carries first indication information; and sending the first data packet, where the first indication information includes one or more of the following: synchronous transmission indication information, packet discard indication information, data type indication information, charging indication information, statistics indication information, or priority indication information.

The communication method provided in at least one embodiment is applied to a terminal device or a server. In at least one embodiment, refined differentiated processing is performed, on a user plane network element, on different data packets at a granularity of a data packet by carrying indication information in the data packet. Compared with data processing performed at a granularity of a data flow, this is better adapted to and meets different user requirements, a network condition change, and the like.

In at least one embodiment, the first indication information includes the packet discard indication information and/or the priority indication information, and the first data packet further carries a delay threshold.

In at least one embodiment, before the generating a first data packet, second configuration information from a first control plane network element is further received, where the second configuration information includes one or more of the following: the synchronous transmission indication information, the packet discard indication information, the data type indication information, the charging indication information, the statistics indication information, or the priority indication information.

In at least one embodiment, a first request message is further sent, where the first request message requests to establish or modify a session, the first request message includes information about a data packet processing type and/or identification information corresponding to a data flow, and the identification information corresponding to the data flow requests to process a data packet in a data flow of the identification information.

In at least one embodiment, the second configuration information includes the synchronous transmission indication information, and a first synchronous transmission identifier is further received, where the first synchronous transmission identifier indicates a first user plane network element to perform synchronous transmission on a data packet that carries a synchronous transmission identifier associated with the first synchronous transmission identifier.

In at least one embodiment, the first data packet includes a first field, the first field includes the first indication information, the first indication information indicates a data packet processing type and/or a parameter required for data processing, and the first field indicates the first user plane network element to process the first data packet.

In at least one embodiment, the data packet processing type includes one or more of the following: synchronous transmission, packet discard processing, routing selection, charging or charging-free processing, statistics or statistics-free processing, improving or reducing a priority, or improving or reducing QoS.

According to a third aspect, at least one embodiment provides a communication method. The method includes: delivering configuration information, where the configuration information includes one or more of the following: synchronous transmission indication information, packet discard indication information, data type indication information, charging indication information, statistics indication information, or priority indication information.

The communication method provided in at least one embodiment is applied to a first control plane network element. In at least one embodiment, a control plane network element configures processing indication information at a packet granularity for a terminal device and/or a user plane network element. The terminal device performs, by carrying the indication information in a data packet, refined differentiated processing on different data packets at a granularity of the data packet on the user plane network element. Compared with data processing performed at a granularity of a data flow, this is better adapted to and meets different user requirements, a network condition change, and the like.

In at least one embodiment, before the delivering configuration information, a first request message is further received, where the first request message requests to establish or modify a session, the first request message includes information about a data packet processing type and/or identification information corresponding to a data flow, and the identification information corresponding to the data flow requests to process a data packet in a data flow of the identification information. A first user plane network element that has a processing capability required for the data packet processing type is selected based on the information about the data packet processing type.

In response to being delivered, the configuration information is delivered to the first user plane network element. In the implementation, the control plane network element delivers the configuration information to the selected first user plane network element, and the first user plane network element has the processing capability required for the data packet processing type, so that the first user plane network element performs differentiated processing on the data packet based on an indication for the terminal device.

In at least one embodiment, the data packet processing type includes one or more of the following: synchronous transmission, packet discard processing, routing selection, charging or charging-free processing, statistics or statistics-free processing, improving or reducing a priority, or improving or reducing QoS.

In at least one embodiment, the data packet processing type includes synchronous transmission, and a first synchronous transmission identifier is further allocated based on a synchronous transmission type and the identification information corresponding to the data flow.

In at least one embodiment, the first synchronous transmission identifier and/or a synchronous transmission precision information is further sent.

In at least one embodiment, the data packet processing type includes packet discard processing, and a delay threshold is further sent.

In at least one embodiment, before the delivering configuration information, a requested data packet processing type is further authorized to be performed on the data packet in the data flow of the identification information.

According to a fourth aspect, at least one embodiment provides a communication apparatus. The communication has a function of implementing the first aspect, a function of implementing the second aspect, or a function of implementing the third aspect. The function is implemented by hardware, or is implemented by hardware by executing corresponding software. The hardware or software includes one or more function modules corresponding to the foregoing function.

According to a fifth aspect, at least one embodiment provides a communication apparatus. The apparatus is the user plane network element in the first aspect, the terminal device in the second aspect and, the control plane network element in the third aspect, or a chip disposed in the user plane network element, the terminal device, or the control plane network element. The apparatus includes a transceiver and a processor, and optionally, further includes a memory. The memory is configured to store a computer program or instructions. The processor is separately coupled to the memory and the transceiver. In response to the processor executing the computer program or the instructions, the apparatus is enabled to perform, by using the transceiver, the method performed by the user plane network element in the first aspect, the method performed by the terminal device in the second aspect, or the method performed by the control plane network element in the third aspect.

According to a sixth aspect, at least one embodiment provides a computer program product. The computer program product includes computer program code. In response to the computer program code being run on a computer, the computer is enabled to perform the method performed by the user plane network element in the first aspect, perform the method performed by the terminal device in the second aspect, or perform the method performed by the control plane network element in the third aspect.

According to a seventh aspect, at least one embodiment provides a chip system, where the chip system includes a processor and a memory, the processor and the memory are electrically coupled to each other. The memory is configured to store computer program instructions. The processor is configured to execute some or all of the computer program instructions in the memory. In response to the some or all of the computer program instructions being executed, a function of the user plane network element in the method according to the first aspect, a function of the terminal device in the method according to the second aspect, or a function of the control plane network element in the method according to the third aspect.

In at least one embodiment, the chip system further includes a transceiver. The transceiver is configured to send a signal processed by the processor, or receive a signal input to the processor. The chip system includes a chip, or includes a chip and another discrete component.

According to an eighth aspect, at least one embodiment provides a computer-readable storage medium. The computer-readable storage medium stores a computer program. In response to the computer program being run, the method performed by the user plane network element in the first aspect, the method performed by the terminal device in the second aspect, or the method performed by the control plane network element in the third aspect.

According to a ninth aspect, at least one embodiment provides a communication system. The system includes the user plane network element that performs the method in the first aspect, and the terminal device that performs the method in the second aspect.

In at least one embodiment, the communication system further includes the control plane network element that performs the method in the third aspect.

BRIEF DESCRIPTION OF DRAWINGS

FIG. 3, FIG. 4B, FIG. 5A and FIG. 5B, FIG. 8A and FIG. 8B, FIG. 10A and FIG. 10B, and FIG. 13A and FIG. 13B each are a schematic diagram of a communication process according to at least one embodiment:

DESCRIPTION OF EMBODIMENTS

Figure 1:
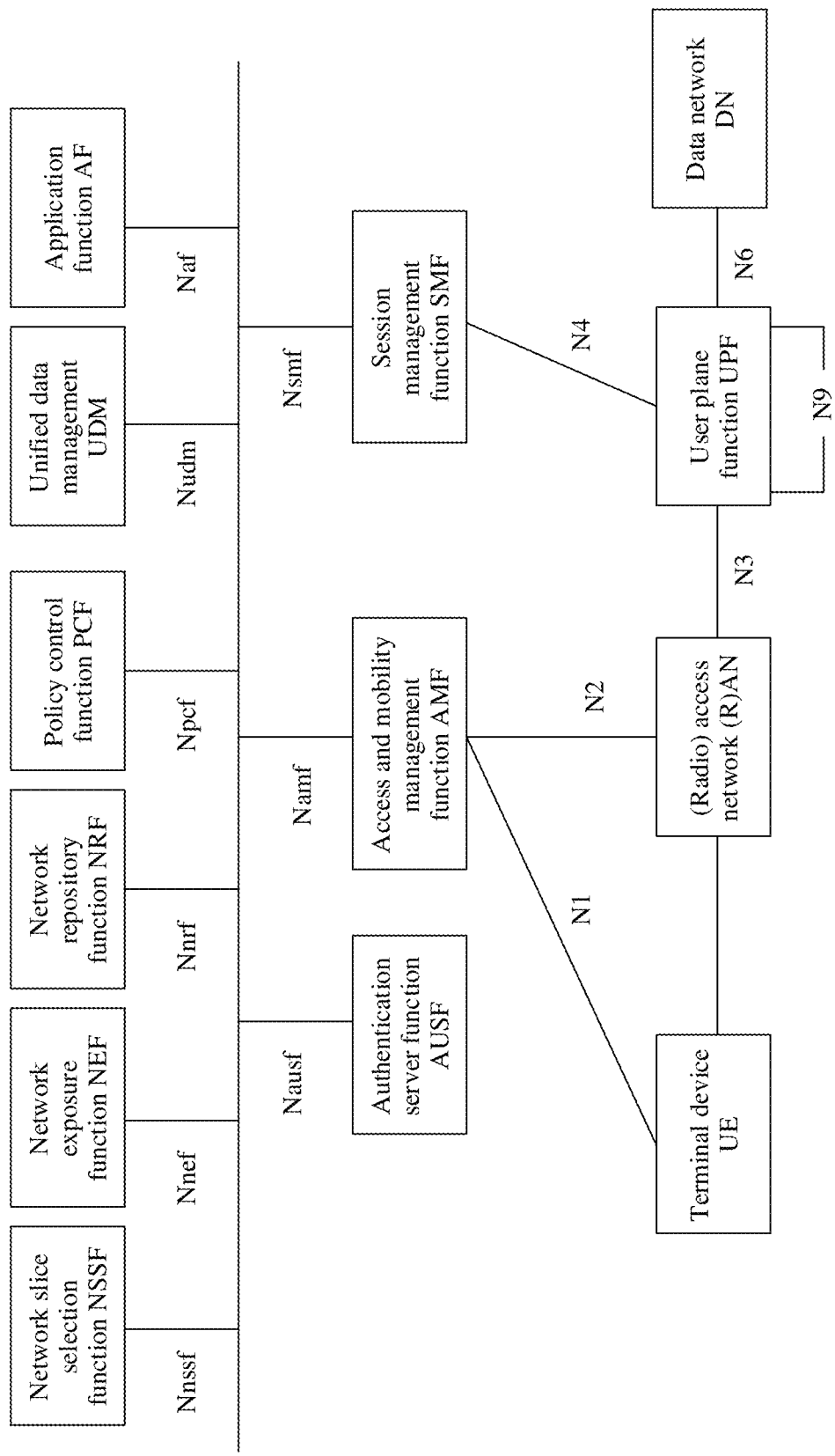
FIG. 1 is a schematic diagram of a communication system architecture according to at least one embodiment.

The following further describes the present invention in detail with reference to accompanying drawings.

All aspects, embodiments, or features are presented by describing a system that includes a plurality of devices, components, modules, and the like. A system includes another device, component, module, and the like, and/or does not include all devices, components, modules, and the like discussed with reference to the accompanying drawings. In addition, a combination of these solutions is used.

In addition, the word "example" in at least one embodiment is used to represent giving an example, an illustration, or a description. Any embodiment or design described as an "example" are not explained as being more preferred or having more advantages than another embodiment or design. Exactly, the term "example" is used to present a concept in a specific manner.

A network architecture and a service scenario that are described in at least one embodiment are intended to describe technical solutions in at least one embodiment more clearly, but constitute no limitation on the technical solutions provided in at least one embodiment. A person of ordinary skill in the art knows that, with evolution of the network architecture and emergence of new service scenarios, the technical solutions provided in at least one embodiment are also applicable to similar technical problems.

The following describes some terms in at least one embodiment, to facilitate understanding of a person skilled in the art.

(1) Terminal device: The terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device includes a handheld device having a wireless connection function or a processing device connected to a wireless modem. The terminal device communicates with a core network through a radio access network (RAN), and exchange a voice or data with the RAN, or interact a voice and data with the RAN. The terminal device includes user equipment (UE), a wireless terminal device, a mobile terminal device, a device-to-device (D2D) communication terminal device, a vehicle to everything (V2X) terminal device, a machine-to-machine/machine-type communication (M2M/MTC) terminal device, an Internet of things (IoT) terminal device, a subscriber unit, a subscriber station, a mobile station, a remote station, an access point (AP), a remote terminal, an access terminal, a user terminal, a user agent, a user device, or the like. For example, the terminal device includes a mobile phone (or referred to as a "cellular" phone), a computer having a mobile terminal device, or a portable, pocket-sized, handheld, or computer built-in mobile apparatus. For example, a device includes a personal communication service (PCS) phone, a cordless telephone set, a session initiation protocol (SIP) phone, a wireless local loop (WLL) station, or a personal digital assistant (PDA). The terminal device alternatively includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example and not limitation, in at least one embodiment, the terminal device is alternatively a wearable device. The wearable device is also referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that implement all or some functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

In response to the various terminal devices described above being located in a vehicle (for example, placed in the vehicle or installed in the vehicle), the terminal devices is all considered as vehicle-mounted terminal devices. For example, the vehicle-mounted terminal devices are also referred to as on-board units (OBUs).

In at least one embodiment, the terminal device further includes a speaker, an image collection device (for example, a camera), and the like.

In at least one embodiment, the terminal device further includes a relay. Alternatively, a device that performs data communication with a base station is considered as the terminal device.

In at least one embodiment, an apparatus configured to implement a function of the terminal device is a terminal device, or is an apparatus, for example, a chip system, that supports the terminal device in implementing the function, for example, a chip system. The apparatus is installed in the terminal device. In at least one embodiment, the chip system includes a chip, or includes a chip and another discrete component. In the technical solutions provided in at least one embodiment, an example in which the terminal device is the apparatus for implementing the function of the terminal is used to describe the technical solutions provided in at least one embodiment.

(2) Network device: The network device includes, for example, an access network (AN) device such as a base station (for example, an access point), and is a device that is in an access network and that communicates with a wireless terminal device over an air interface through one or more cells. Alternatively, for example, the network device in a vehicle-to-everything (V2X) technology is a road side unit (RSU). The base station is configured to perform mutual conversion between a received over-the-air frame and an IP packet, to serve as a router between a terminal device and a remaining part of the access network, where the remaining part of the access network includes an IP network. The RSU is a fixed infrastructure entity supporting a V2X application, and exchanges a message with another entity supporting the V2X application. The network device further coordinates attribute management of the air interface. For example, the network device includes an evolved NodeB (NodeB, eNB, or e-NodeB, evolved NodeB) in a long term evolution (LTE) system or a long term evolution-advanced (LTE-A) system, includes a next generation NodeB (gNB) in a 5th generation (5G) mobile communication technology NR system (also briefly referred to as an NR system), or includes a centralized unit (CU) and a distributed unit (DU) in a cloud radio access network (Cloud RAN) system. This is not limited in at least one embodiment.

The network device further includes a core network (CN) device, and the core network device includes, for example, an access and mobility management function (AMF).

(3) Service flow: The service flow includes a series of data packets with a same quintuple. To be specific, the series of data packets with the same quintuple belong to the same service flow. The service flow is uniquely identified by the quintuple carried in the data packet. The quintuple includes a source address, a destination address, a source port number, a destination port number, and a protocol type (for example, a transmission layer protocol). In at least one embodiment, the service flow is also referred to as a data flow, or referred to as a flow for short, and the data packet is also referred to as a packet for short.

The term "and/or" in at least one embodiment describes an association relationship for describing associated objects and represents that three relationships exist. For example, A and/or B represents the following three cases: Only A exists, both A and B exist, and only B exists. The character "/" generally indicates an "or" relationship between the associated objects.

"A plurality of" in at least one embodiment means two or more.

In addition, in descriptions of at least one embodiment, terms such as "first" and "second" are only used for distinguishing and description, but is not to be understood as indicating or implying relative importance, or is not to be understood as indicating or implying a sequence.

The technical solutions in at least one embodiment is applied to various communication systems, for example, a global system for mobile communication (GSM) system, a code division multiple access (CDMA) system, a WCDMA system, a general packet radio service (GPRS) system, an LTE system, an LTE frequency division duplex (FDD) system, an LTE time division duplex (TDD) system, a universal mobile communication system (UMTS), a worldwide interoperability for microwave access (WiMAX) communication system, a Multefire communication system, a fixed communication system, a 5G system or NR, and a future 6th generation communication system.

To facilitate understanding of at least one embodiment, a 5G network architecture shown in FIG. 1 is used as an example to describe a scenario used in at least one embodiment. For another communication network architecture similar to the 5G network architecture, details are not described. The 5G network device architecture shown in FIG. 1 includes a terminal device part, a data network (DN), and an operator network part. The following briefly describes functions of some network elements.

The operator network includes one or more of the following network elements: an authentication server function (AUSF) network element, a network exposure function (NEF) network element, a policy control function (PCF) network element, a unified data management (UDM) network element, a unified data repository (UDR) (not shown in the figure), an unstructured data storage function (UDSF) (not shown in the figure), a network repository function (NRF) network element, an application function (AF) network element, an access and mobility management function (AMF) network element, a session management function (SMF) network element, a radio access network (RAN) network element, a user plane function (UPF) network element, a network slice selection function (NSSF) network element, and the like. In the foregoing operator network, a part other than the radio access network is referred to as a core network part.

For example, a user plane network element includes a (R)AN, the UPF network element, and a DN, and a control plane network element includes the AUSF network element, the UDM network element, the AMF network element, the SMF network element network element, the PCF network element, and the AF network element.

The terminal device is also referred to as user equipment (UE), and is a device that is used by a user and that has a wireless receiving and sending function.

The (R)AN is a subnetwork of the operator network and an implementation system between a service node on the operator network and the terminal device. To connect to the operator network, the terminal device first connects to the (R)AN and then is connected to the service node of the operator network by using the (R)AN. A (R)AN device is a device that provides a wireless communication function for the terminal device, and the RAN device is also referred to as an access network device. The RAN device in at least one embodiment includes but is not limited to: a gNB, an eNB, a radio network controller (RNC), a NodeB (NB), a base station controller (BSC), a base transceiver station (BTS), a home evolved NodeB (for example, a home evolved NodeB, or a home NodeB, HNB), a baseband unit (BBU), a transmission reception point (TRP), and a transmitting point (TP), a mobile switching center, and the like.

The AMF network element is responsible for management such as user access and mobility. Functions of the AMF include: termination of non-access stratum (NAS) signaling security, user registration, reachability, mobility management, N1/N2 interface signaling transmission, access authentication and authorization, and the like.

The SMF network element provides session management (for example, session establishment, modification, or release), internet protocol (IP) address allocation and management, UPF selection and control, and the like for a session of the terminal device.

The UPF network element serves as an interface UPF of a data network, and provides functions such as user packet forwarding and processing, charging statistics based on a session/flow level, bandwidth throttling, and quality of service (QOS) policy execution.

The UDM network element is mainly responsible for functions such as subscription data management, user access authorization, and authentication information generation.

The NEF network element is mainly configured to support capability and event exposure, and receive related external information.

The AF network element represents that the AF network element is applied to another control network element for interaction, including providing a service QoS policy requirement, a routing policy requirement, and the like. An AF is a third-party functional entity or an application service deployed by an operator, for example, an IMS voice call service.

The UDR network element provides a capability of storing subscription data, policy data, and capability exposure data.

The UDSF stores unstructured data of each network element.

The PCF network element is responsible for generating a terminal device access policy and a QoS flow control policy.

The NRF network element is configured to provide a network element discovery function and provide, based on a request from another network element, network element information corresponding to a network element type. The NRF further provides a network element management service, for example, registration, update, and deregistration of a network element and subscription and push of a network element status.

The AUSF network element is mainly responsible for user authentication, to determine whether to allow a user or a device to access a network.

The NSSF network element is mainly configured to: select a network slice, perform user counting on the network slice, and the like.

The DN is a network outside the operator network. The operator network accesses a plurality of DNs. A plurality of services is deployed in the DN, and the DN provides services such as a data service and/or a voice service for the terminal device. The DN is identified by a data network name (DNN) in a 5G network. For example, the DN includes the Internet, an IP multimedia subsystem (IMS) network, and the like.

In FIG. 1, Nnssf, Nausf, Nnef, Npcf, Nudm, Naf, Namf, Nsmf, N1, N2, N3, N4, N6, and N9 are interface sequence numbers. For meanings of these interface sequence numbers, refer to meanings defined in the 3rd generation partnership project (3GPP) standard protocol. This is not limited herein.

The schematic diagram of the network architecture shown in FIG. 1 is understood as a schematic diagram of a service-based 5G network architecture in a non-roaming scenario. At least one embodiment is also applicable to a roaming scenario.

Figure 2:
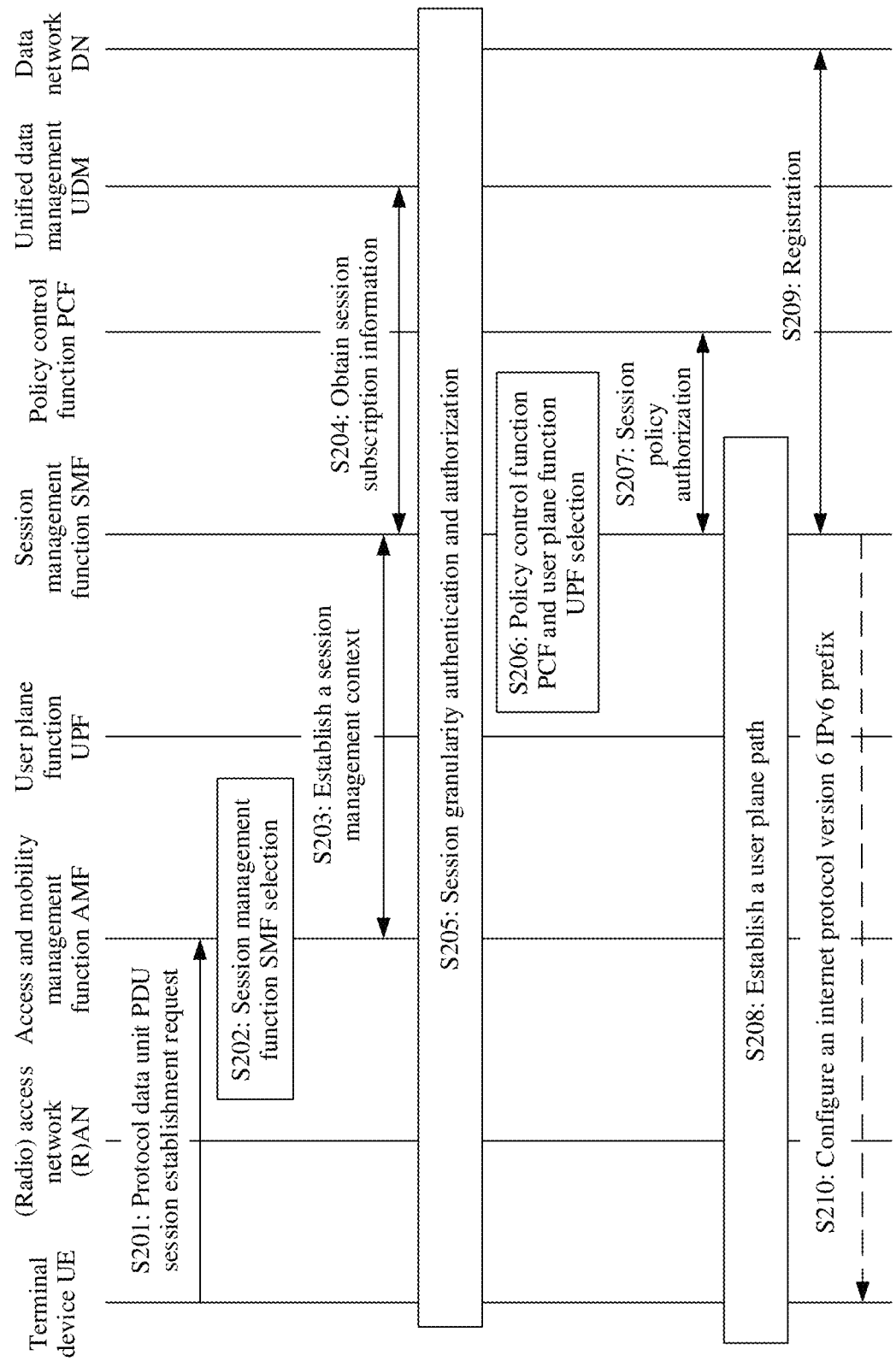
FIG. 2 is a schematic flowchart of PDU session establishment according to at least one embodiment.

Based on the network architecture shown in FIG. 1, in a 5G network, a PDU session is used to establish a user plane transmission channel for a terminal device. The PDU session (also referred to as a "session") establishment procedure is used to create a new PDU session for the terminal device, and allocate an end-to-end user plane connection resource between the terminal device and an anchor UPF network element. FIG. 2 is a schematic diagram of a PDU session establishment procedure, including the following process.

S201: A terminal device sends a PDU session establishment request to an AMF network element.

S202: The AMF network element selects an SMF network element.

S203: Establish a PDU session management context between the AMF network element and the SMF network element.

S204: The SMF network element obtains session subscription information from a UDM network element.

A session management subscription data includes information such as a session type, a default session parameter value, and a subscribed session aggregate maximum bit rate (aggregate maximum bit rate, AMBR).

S205: The SMF network element performs PDU session granularity authentication and authorization.

The SMF network element and a third-party authentication, authorization, and accounting (AAA) server in a DN perform secondary authentication and authorization on a PDU session.

S206: The SMF network element selects a PCF network element and a UPF network element for the PDU session.

S207: The SMF network element obtains session policy information from the PCF network element, to implement session policy authorization.

S208: Establish an end-to-end user plane path between the terminal device, a (R)AN, and the UPF network element.

In the process, the UPF network element and/or the terminal device obtains, from a control plane network element (for example, the SMF network element), a parameter required for data packet processing. For example, a service flow 1 transmits the data packet by using a QoS parameter 1, a service flow 2 performs packet discard processing, and a service flow 3 transmits the data packet by using a QoS parameter 2.

S209: The SMF network element registers with UDM network element, and the UDM network element records an SMF identifier corresponding to the PDU session.

S210: The SMF network element allocates an IPV6 prefix to the terminal device.

In response to the session type being IPv6 or IPv4v6, the SMF network element generates a router advertisement (RA) message that carries the IPv6 prefix allocated for the session, and sends the message to the terminal device through a user plane.

After the PDU session is established, the UPF network element and/or the terminal device view/views a quintuple of the data packet, match/matches a data flow to which the data packet belongs, and then process/processes the data packet based on the parameter that is required for data packet processing and that is obtained in S208. For example, the data packet in the service flow 1 is transmitted by using the QoS parameter 1, packet discard processing is performed on the data packet in the service flow 2, or the data packet in the service flow 3 is transmitted by using the QoS parameter 2. A user plane network element identifies, by using the quintuple carried in the data packet, the service flow to which the data packet belongs, and performs a unified operation on the data packet of the service flow. Because differentiated processing cannot be performed on different data packets in one service flow, adapting to and meeting a temporary change of a user or a network condition change is difficult.

In view of this, to enable the user plane network element to perform differentiated processing on different data packets, at least one embodiment provides a communication method. In the method, the terminal device sends the data packet that carries first indication information, where the first indication information includes one or more of synchronous transmission indication information, packet discard indication information, data type indication information, charging indication information, statistics indication information, or priority indication information. The user plane network element performs corresponding processing on the received data packet based on the first indication information in the received data packet, so that the user plane network element performs refined differentiated processing on different data packets, to ensure to adapt to and meet different uses by a user and network conditions. In other words, in at least one embodiment, a control granularity implements control at a (data) packet granularity instead of a (data) flow granularity.

The communication method provided in at least one embodiment is applied to a communication system shown in FIG. 1. The communication method provided in at least one embodiment mainly uses an example in which a first user plane network element is the UPF network element, and is also applicable to another user plane network element (for example, the (R)AN): uses the terminal device as an example, and is also applicable to a server; and uses an example in which a first control plane network element is the SMF network element, and is also applicable to another control plane network element.

Figure 3:
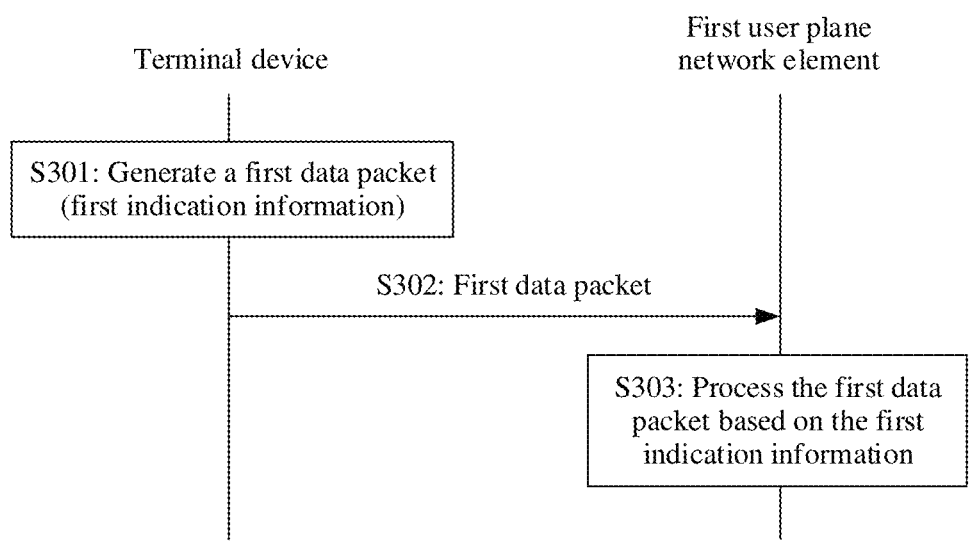

Refer to FIG. 3. The following describes in detail a specific process of the communication method. The process includes the following steps.

S301: A terminal device generates a first data packet, where the first data packet carries first indication information.

The first indication information includes one or more of the following information: synchronous transmission indication information, packet discard indication information, data type indication information, charging indication information, statistics indication information, priority indication information, or the like.

The terminal device determines, based on different requirements, specific information included in the first indication information. For example, in response to data packets of data flows generated by a plurality of sound source speakers being combined with audio tracks, data packets of data flows generated by a plurality of interaction devices need to be synchronized, or data packets of data flows collected by a plurality of cameras need to be synchronized, the first indication information includes the synchronous transmission indication information. In response to a mechanical arm (which is also another device) providing feed back status information (for example, posture information and power information) in real time to a host computer for display, in response to a transmission delay of the data packet exceeding a delay threshold, data in the data packet is expired data, and the data packet cannot be sent to the host computer. The first indication information includes the packet discard indication information. Holographic data, augmented reality (AR) data, or virtual reality (VR) data needs to be transmitted to a server for processing. Some data in the holographic/AR/VR data is computing-delay-sensitivity data (which is also referred to as computing-delay-sensitive data), and some data is computing-delay-insensitivity data (which is also referred to as computing-delay-tolerant data). The first indication information includes the data type indication information. Alternatively, in response to corresponding processing being performed on video frames of different types, the first indication information includes the data type indication information. In response to charging or charging-free processing being performed on a data packet generated by an application (APP) installed on the terminal device, the first indication information includes the charging indication information. In response to statistics or statistics-free processing being performed on the data packet generated by the APP installed on the terminal device, the first indication information includes the statistics indication information. In response to importance of data in the data packet being higher or lower than importance of data in another data packet, the first indication information includes the priority indication information or the like.

Optionally, in response to the first indication information including the packet discard indication information and/or the priority indication information, the first data packet further carries the delay threshold. A value of the delay threshold is random, and is not limited in at least one embodiment. For example, the delay threshold is 5 milliseconds (ms), 10 ms, or the like.

In at least one embodiment, the APP of the terminal device generates a data packet A, and the terminal device adds the first indication information to the data packet A, to generate the first data packet. Optionally, in response to the APP of the terminal device expecting to implement synchronous transmission, the terminal device further adds an (allocated) synchronous transmission identifier (ID) to the data packet A, to generate a second data packet, and send the second data packet to an access network element. The access network element generates the first data packet based on the second data packet, and sends the first data packet to a first user plane network element.

Figure 4A:
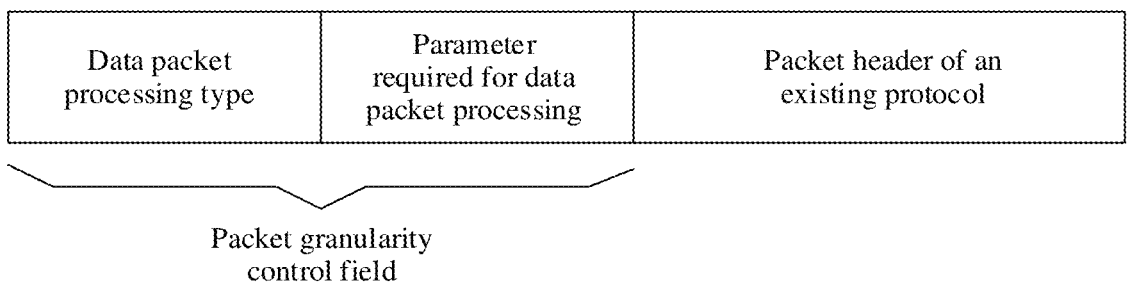
FIG. 4A, FIG. 7, FIG. 12, FIG. 15, and FIG. 16 each are a schematic diagram of a structure of a data packet according to at least one embodiment.

In at least one embodiment, the APP of the terminal device generates the data packet A, and the terminal device adds a first field based on the data packet A, to generate the first data packet. In other words, the first data packet includes the first field, and the first field includes the first indication information. The first indication information indicates a data packet processing type and/or a parameter required for data processing, and the first field indicates the first user plane network element to process the first data packet. The data packet processing type includes one or more of the following: synchronous transmission, packet discard processing, routing selection, charging or charging-free processing, statistics or statistics-free processing, improving or reducing a priority, improving or reducing QoS, or the like. The parameter required for data packet processing includes one or more of the following: a synchronous transmission ID allocated for synchronous transmission, a data type, a null value, or the like. As shown in FIG. 4A, the first data packet includes a packet granularity control field (namely, the first field) and the data packet A, where the first field is represented by command, a packet header of the data packet A uses a protocol such as the GPRS tunneling protocol (GTP), or the service data adaptation protocol (SDAP), the data packet processing type is represented by action, and the parameter required for data packet processing is represented by flag. The data packet processing type action and the parameter flag are only terms shown in at least one embodiment, or other terms is used to describe the data packet processing type and the parameter, to implement similar or same functions. For example, the APP of the terminal device expects to implement synchronous transmission, the data packet processing type in the first field includes synchronous transmission, and the parameter required for data packet processing in the first field includes the synchronous transmission identifier allocated for synchronous transmission.

Before S301, a first control plane network element delivers second configuration information, and the terminal device receives the second configuration information from the first control plane network element, where the second configuration information includes one or more of the following information: the synchronous transmission indication information, the packet discard indication information, the data type indication information, the charging indication information, the statistics indication information, the priority indication information, or the like. The first control plane network element preconfigures configuration information related to data packet processing to the terminal device. In a process of performing S301, the terminal device selects, based on the second configuration information and an actual requirement, specific information included in the first indication information.

Optionally, before S301, the terminal device further sends a first request message, where the first request message requests to establish or modify a session. For example, the first request message is a PDU session establishment or modification request message, and the PDU session establishment or modification request message requests to establish or modify a PDU session. The first request message includes information about the data packet processing type and/or identification information corresponding to a data flow. The identification information corresponding to the data flow requests to process a data packet in a data flow of the identification information, and the identification information corresponding to the data flow is used to uniquely identify the data flow. In at least one embodiment, an example in which the identification information corresponding to the data flow is an APP ID is used for description.

The second configuration information is sent in a process of establishing a user plane path of the terminal device. To be specific, after receiving the first request message, the first control plane network element sends the second configuration information before the user plane path of the terminal device is established. Specifically, after receiving the first request message, the first control plane network element further selects, based on the information about the data packet processing type, a first user plane network element that has a processing capability required for the data packet processing type. In other words, the first user plane network element selected by the first control plane network element supports the data packet processing type.

For example, the first control plane network element (for example, an SMF network element) further gives authorization to perform a requested data packet processing type on the data packet in a data flow of the identification information. For example, the first control plane network element gives authorization to perform synchronous transmission on a data packet in an APP1 ID of a terminal device 1, or a second control plane network element (UDM network element) gives authorization to perform the requested data packet processing type on the data packet in a data flow of the identification information.

In response to the data packet processing type including synchronous transmission, the first control plane network element further allocates a first synchronous transmission identifier for the terminal device (or the identification information corresponding to the data flow). For example, the first control plane network element allocates the first synchronous transmission identifier based on a synchronous transmission type and/or the identification information corresponding to the data flow.

The terminal device further receives the first synchronous transmission identifier, where the first synchronous transmission identifier indicates the first user plane network element to perform synchronous transmission on a data packet that carries a synchronous transmission identifier associated with the first synchronous transmission identifier. The second configuration information further includes the first synchronous transmission identifier, or other information carries the first synchronous transmission identifier. In S301, in response to the first indication information including synchronous transmission, the first data packet further includes the first synchronous transmission identifier.

S302: The terminal device sends the first data packet, and the first user plane network element receives the first data packet.

For example, the terminal device sends the first data packet to the access network element, and the access network element sends the first data packet to the first user plane network element. The access network element is also referred to as a second user plane network element. Optionally, in response to the APP of the terminal device expecting to implement synchronous transmission, the terminal device sends the second data packet to the access network element, where the second data packet carries a second synchronous transmission identifier. For example, the access network element sequentially adds the synchronous transmission indication information to each second data packet based on a time sequence of receiving each second data packet, to generate the first data packet, and send the generated first data packet to the first user plane network element each time after adding the synchronous transmission indication information.

Before S302, the first control plane network element delivers first configuration information, and the first user plane network element receives the first configuration information from the first control plane network element, where the first configuration information includes one or more of the following information: the synchronous transmission indication information, the packet discard indication information, the data type indication information, the charging indication information, the statistics indication information, the priority indication information, or the like. The first configuration information configures a packet detection rule (PDR) and/or a forwarding action rule (FAR) in the first user plane network element. In a subsequent process of performing S303, in response to a data packet processing type indicated by the first indication information being associated with the data packet processing type indicated by the first configuration information, the first user plane network element performs corresponding processing on the first data packet based on the first indication information. For a specific processing process of the first user plane network element, refer to the following S303.

The first user plane network element is selected by the first control plane network element, and the first user plane network element has the processing capability required for the data packet processing type. The first control plane network element delivers the first configuration information to the selected first user plane network element.

Optionally, in response to the first configuration information including the synchronous transmission indication information, the first control plane network element further sends the first synchronous transmission identifier and/or a synchronous transmission precision condition that are/is allocated for the terminal device. The first synchronous transmission identifier indicates the first user plane network element to perform synchronous transmission on the data packet that carries the synchronous transmission identifier associated with the first synchronous transmission identifier. The synchronous transmission precision condition indicates synchronous transmission precision that needs to be achieved in a synchronous transmission process. For example, the synchronous transmission precision condition is 99%. The terminal device 1 and a terminal device 2 each send 100 data packets. In this case, synchronous transmission is implemented (or needs to be implemented) for 99 data packets thereof. The first configuration information further includes the first synchronous transmission identifier and/or the synchronous transmission precision requirement, or other information carries the first synchronous transmission identifier and/or the synchronous transmission precision requirement.

In response to the data packet processing type including one or more of packet discard processing, improving or reducing a priority, improving or reducing QoS, or the like, the first control plane network element further sends the delay threshold. The value of the delay threshold is random. This is not limited in at least one embodiment.

S303: The first user plane network element processes the first data packet based on the first indication information.

Specifically, the first user plane network element performs differentiated processing on the received data packet based on different information carried in the first indication information. The following provides a detailed example for description.

In response to the first indication information including the synchronous transmission indication information, in S303, the first user plane network element synchronously transmits the first data packet and at least one second data packet. The synchronous transmission indication information carried in the at least one second data packet is associated with the synchronous transmission indication information carried in the first data packet. In at least one embodiment, the synchronous transmission indication information carried in the at least one second data packet and the synchronous transmission indication information carried in the first data packet are the same or have an association relationship. In at least one embodiment, a third synchronous transmission identifier carried in the at least one second data packet and the first synchronous transmission identifier carried in the first data packet are the same, a third synchronous transmission identifier and the first synchronous transmission identifier have an association relationship (for example, stored in a same association table), or a third synchronous transmission identifier and the first synchronous transmission identifier is mutually converted by using a preset algorithm (obtained by mutually deriving by using a mathematical formula).

Synchronous transmission in at least one embodiment means that a data packet that needs to be synchronously transmitted is sent in a first time interval. For example, the first user plane network element configures the first time interval for the data packet that needs to be synchronously transmitted for transmission, which is alternatively implemented by using another scheduling mechanism. In at least one embodiment, the first time interval represents any time interval. This is not limited in at least one embodiment.

Optionally, the first data packet is a data packet in a first data flow, and the second data packet is a data packet in a second data flow. That is, the first data packet and the second data packet belong to different data flows. The first user plane network element implements synchronous transmission of data packets in a plurality of data flows, so that an error in synchronous transmission is avoided, and a synchronization error between data flows that use synchronous transmission is avoided.

In response to the first indication information including the packet discard indication information, in S303, the first user plane network element discards the first data packet based on the packet discard indication information in response to network congestion occurring: or after the first data packet is received, the first user plane network element discards the first data packet based on the packet discard indication information in response to identifying that transmission duration of the first data packet exceeds the delay threshold.

In response to the first indication information including the data type indication information, the data type indication information is used to indicate the computing-delay-sensitive data or the computing-delay-tolerant data. A user plane network element configured to process the computing-delay-sensitive data and a user plane network element configured to process the computing-delay-tolerant data is different. For example, the user plane network element configured to process the computing-delay-sensitive data is a UPF network element 1, and the user plane network element configured to process the computing-delay-tolerant data is a UPF network element 2. In this way, the network architecture further includes an uplink classifier (ULCL), and the ULCL is alternatively considered as the user plane network element. The ULCL performs data packet routing selection or data packet offloading transmission, transmit a data packet of the computing-delay-sensitive data to the UPF network element 1, and transmit a data packet of the computing-delay-tolerant data to the UPF network element 2.

In response to the first indication information including the data type indication information, and the data type indication information indicates a video frame type of the first data packet. The video frame type includes one or more of the following: an I-frame, a P-frame, or a B-frame. Generally, each data packet carries one type of video frame data.

QoS guarantee provided by the first user plane network element for a data packet whose video frame type is the I-frame is higher than QoS guarantee provided for a data packet whose video frame type is the P-frame or the B-frame. For example, in response to the data type indication information in the first data packet indicating that the video frame type is the I-frame, the first user plane network element improves QoS guarantee of the first data packet in response to network congestion occurring: or the first user plane network element improves QoS guarantee of the first data packet In response to identifying that the transmission duration of the first data packet exceeds the delay threshold. In response to the data type indication information in the first data packet indicating that the video frame type is the P-frame or the B-frame, the first user plane network element reduces QoS guarantee of the first data packet in response to network congestion occurring; or the first user plane network element reduces QoS guarantee of the first data packet in response to identifying that the transmission duration of the first data packet exceeds the delay threshold.

In response to the first indication information including the charging indication information, in S303, the first user plane network element executes, for the first data packet, a charging rule indicated by the charging indication information. The first user plane network element performs charging or charging-free on the first data packet based on the charging indication information and the charging rule. For example, in response to the charging indication information indicates that the first data packet does not need to be charged or is free of charging, the first user plane network element does not perform charging or perform charging-free on the first data packet: or in response to the charging indication information providing an indication to perform double charging on the first data packet, the first user plane network element performs double charging on the first data packet.

In response to the first indication information including the statistics indication information, in S303, the first user plane network element executes, for the first data packet, a statistics rule indicated by the statistics indication information. The first user plane network element performs statistics or statistics-free on the first data packet based on the statistics indication information and the statistics rule. For example, in response to the statistics indication information indicating that the first data packet does not need to be counted or is free of counting, the first user plane network element does not perform statistics or perform statistics-free on the first data packet: or in response to the statistics indication information providing an indication to perform double statistics on the first data packet, the first user plane network element performs double statistics on the first data packet.

In response to the first indication information including the priority indication information, and the priority indication information includes a high priority, in other words, indicates that the first data packet is the high priority, in S303, the first user plane network element transmits the first data packet in response to network congestion occurring: or after the first data packet is received, the first user plane network element improves QoS guarantee of the first data packet in response to identifying that the transmission duration of the first data packet exceeds the delay threshold.

In response to the priority indication information including a low priority, in other words, indicates that the first data packet is the low priority, in S303, the first user plane network element discards (or does not transmit) the first data packet in response to network congestion occurring: or after the first data packet is received, the first user plane network element reduces QoS guarantee of the first data packet in response to identifying that the transmission duration of the first data packet exceeds the delay threshold.

According to the solutions provided in at least one embodiment, in the communication process, the terminal device sends the data packet that carries the first indication information, where the first indication information includes one or more of the synchronous transmission indication information, the packet discard indication information, the data type indication information, the charging indication information, the statistics indication information, or the priority indication information. The user plane network element performs corresponding processing on the received data packet based on the first indication information in the received data packet, so that the user plane network element performs refined differentiated processing on different data packets at the packet granularity, to ensure to adapt to and meet different uses by user and network conditions.

Next, a communication process is described.

A first user plane network element receives a first data packet, where the first data packet carries first indication information. The first indication information includes one or more of the following: synchronous transmission indication information, packet discard indication information, data type indication information, charging indication information, statistics indication information, or priority indication information. For the process, refer to the foregoing S302. Details are not described herein again.

The first user plane network element processes the first data packet based on the first indication information. For the process, refer to the foregoing S303.

Further, the first indication information includes the synchronous transmission indication information. In response to processing the first data packet based on the first indication information, the first user plane network element synchronously transmits the first data packet and at least one second data packet, where synchronous transmission indication information carried in the at least one second data packet is associated with the synchronous transmission indication information carried in the first data packet.

In at least one embodiment, the first data packet is a data packet in a first data flow, and the second data packet is a data packet in a second data flow.

Further, the first indication information includes the packet discard indication information. In response to processing the first data packet based on the first indication information, the first user plane network element discards the first data packet based on the packet discard indication information in response to network congestion occurring: or after the first data packet is received, discard the first data packet based on the packet discard indication information in response to identifying that transmission duration of the first data packet exceeds a delay threshold, where the delay threshold is received by the first user plane network element from a first control plane network element or the first data packet carries the delay threshold.

In at least one embodiment, the first indication information includes the data type indication information, the data type indication information indicates a video frame type of the first data packet, and the video frame type includes one or more of the following: an I-frame, a P-frame, or a B-frame. Quality of service QoS guarantee provided by the first user plane network element for a data packet whose video frame type is the I-frame is higher than QoS guarantee provided for a data packet whose video frame type is the P-frame or the B-frame.

Further, the first indication information includes the charging indication information: and in response to processing the first data packet based on the first indication information, the first user plane network element executes, for the first data packet, a charging rule indicated by the charging indication information.

Further, the first indication information includes the statistics indication information; and in response to processing the first data packet based on the first indication information, the first user plane network element executes, for the first data packet, a statistics rule indicated by the statistics indication information.

Further, the first indication information includes the priority indication information, and the priority indication information includes a high priority. In response to processing the first data packet based on the first indication information, the first user plane network element transmits the first data packet in response to network congestion occurring, or after the first data packet is received, improve QoS guarantee of the first data packet in response to identifying that the transmission duration of the first data packet exceeds the delay threshold.

In at least one embodiment, the first data packet includes a first field, the first field includes the first indication information, the first indication information indicates a data packet processing type and/or a parameter required for data processing, and the first field indicates the first user plane network element to process the first data packet.

In at least one embodiment, the data packet processing type includes one or more of the following: synchronous transmission, packet discard processing, routing selection, charging or charging-free processing, statistics or statistics-free processing, improving or reducing a priority, or improving or reducing QoS.

Further, before processing the first data packet based on the first indication information, the first user plane network element further receives first configuration information from the first control plane network element, where the first configuration information includes one or more of the following: the synchronous transmission indication information, the packet discard indication information, the data type indication information, the charging indication information, the statistics indication information, or the priority indication information.

In response to processing the first data packet based on the first indication information, in response to a data packet processing type indicated by the first indication information being associated with the data packet processing type indicated by the first configuration information, the first user plane network element processes the first data packet based on the first indication information.

Further, the first configuration information includes the synchronous transmission indication information, and the first user plane network element further receives a first synchronous transmission identifier and/or a synchronous transmission precision requirement, where the first synchronous transmission identifier indicates the first user plane network element to perform synchronous transmission on a data packet that carries a synchronous transmission identifier associated with the first synchronous transmission identifier.

In at least one embodiment, the first indication information includes the synchronous transmission indication information, the first data packet is a data packet generated by an access network element by adding the synchronous transmission indication information to a second data packet, the second data packet comes from a terminal device or a server, and the second data packet carries a second synchronous transmission identifier.

Next, a communication process is described.

A terminal device or a server generates a first data packet, where the first data packet carries first indication information. The first indication information includes one or more of the following: synchronous transmission indication information, packet discard indication information, data type indication information, charging indication information, statistics indication information, or priority indication information. For the process, refer to the foregoing S301. Details are not described herein again.

The terminal device or the server sends the first data packet. For the process, refer to the foregoing S302. Details are not described herein again.

In at least one embodiment, the first indication information includes the packet discard indication information and/or the priority indication information, and the first data packet further carries a delay threshold.

Further, before generating the first data packet, the terminal device or the server further receives second configuration information from a first control plane network element, where the second configuration information includes one or more of the following: the synchronous transmission indication information, the packet discard indication information, the data type indication information, the charging indication information, the statistics indication information, or the priority indication information.

Further, the terminal device or the server further sends a first request message, where the first request message requests to establish or modify a session, the first request message includes information about a data packet processing type and/or identification information corresponding to a data flow, and the identification information corresponding to the data flow requests to process a data packet in a data flow of the identification information.

Further, the second configuration information includes the synchronous transmission indication information, and the terminal device or the server further receives a first synchronous transmission identifier, where the first synchronous transmission identifier indicates the first user plane network element to perform synchronous transmission on a data packet that carries a synchronous transmission identifier associated with the first synchronous transmission identifier.

In at least one embodiment, the first data packet includes a first field, the first field includes the first indication information, the first indication information indicates the data packet processing type and/or a parameter required for data processing, and the first field indicates the first user plane network element to process the first data packet.

In at least one embodiment, the data packet processing type includes one or more of the following: synchronous transmission, packet discard processing, routing selection, charging or charging-free processing, statistics or statistics-free processing, improving or reducing a priority, or improving or reducing QoS.

Next, a communication process is described.

A first control plane network element delivers configuration information, where the configuration information includes one or more of the following: synchronous transmission indication information, packet discard indication information, data type indication information, charging indication information, statistics indication information, or priority indication information.

Further, before delivering the configuration information, the first control plane network element further receives a first request message, where the first request message requests to establish or modify a session, a first request includes information about a data packet processing type and/or identification information corresponding to a data flow, and the identification information corresponding to the data flow requests to process a data packet in a data flow of the identification information. The first control plane network element further selects, based on the information about the data packet processing type, a first user plane network element that has a processing capability required for the data packet processing type.

In response to delivering the configuration information, the first control plane network element delivers the configuration information to the first user plane network element.

In at least one embodiment, the data packet processing type includes one or more of the following: synchronous transmission, packet discard processing, routing selection, charging or charging-free processing, statistics or statistics-free processing, improving or reducing a priority, or improving or reducing QoS.

Further, the data packet processing type includes synchronous transmission, and the first control plane network element further allocates a first synchronous transmission identifier based on a synchronous transmission type and the identification information corresponding to the data flow.

Further, the first control plane network element further sends the first synchronous transmission identifier and/or a synchronous transmission precision requirement.

Further, the data packet processing type includes packet discard processing, and the first control plane network element further sends a delay threshold.

Further, before delivering the configuration information, the first control plane network element further gives authorization to perform a requested data packet processing type on the data packet in a data flow of the identification information.

Figure 4B:
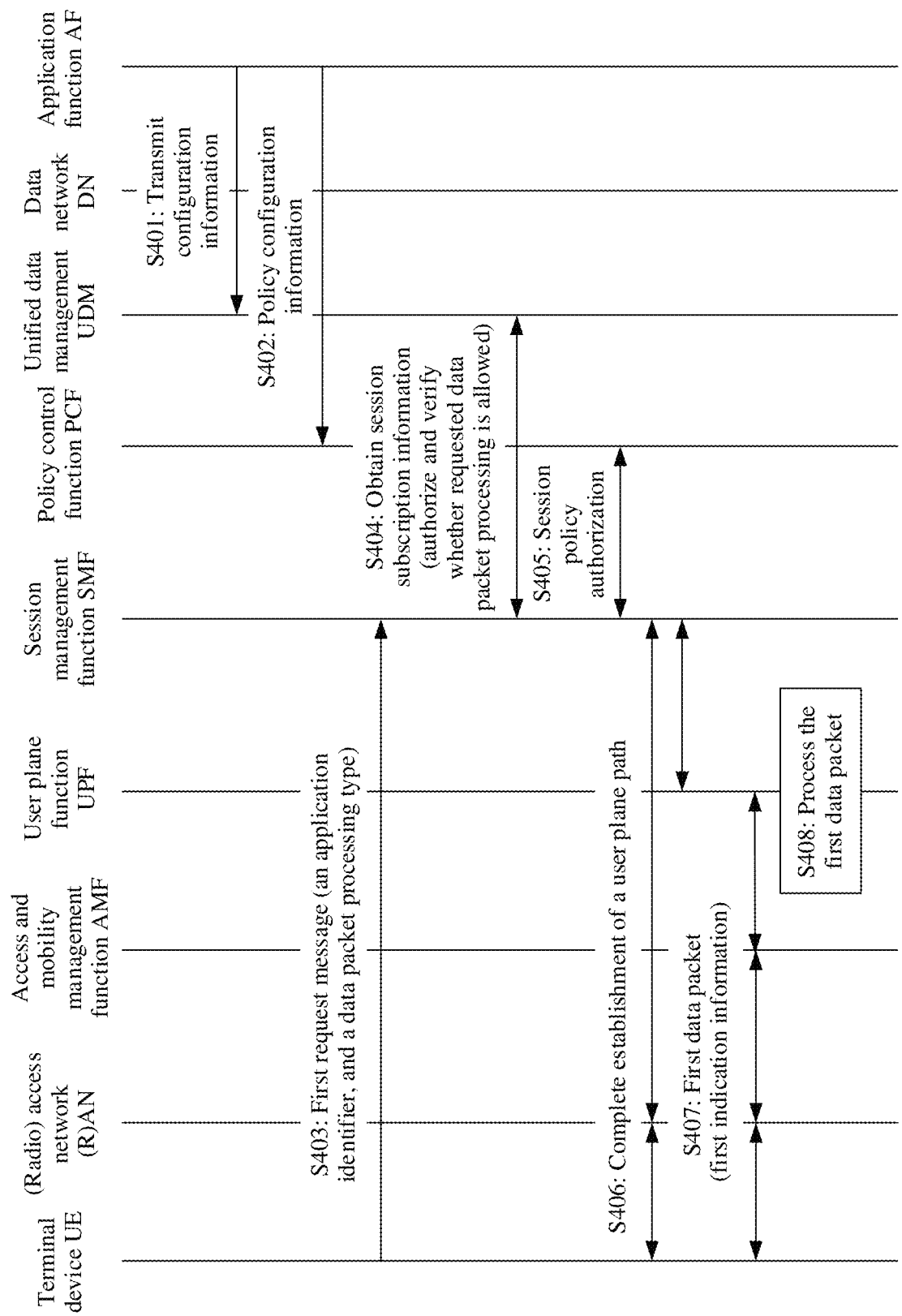

In the communication processes provided in at least one embodiment, the user plane network element and the control plane network element simultaneously supports differentiated processing on the data packet. As shown in FIG. 4B, the following process is included.

S401: An AF network element sends transmission configuration information to the UDM network element.

The transmission configuration information is related to the data packet processing type. For example, for different data packet processing types, information carried in the transmission configuration information is different.

S402: The AF network element sends policy configuration information to a PCF network element.

The policy configuration information is also related to the data packet processing type. For example, for the data packet processing type of synchronous transmission, the policy configuration information indicates the synchronous transmission precision requirement.

In at least one embodiment, S402 is an optional step. For example, for the data packet processing type of packet discard processing, the AF network element does not send the policy configuration information to the PCF network element. That is, the AF network element does not perform S402.

S403: The terminal device sends the first request message, where the first request message requests to establish or modify the session.

The first request message carries identification information of the APP installed on the terminal device (which is referred to as an application identifier/APP identifier for short below) and the information about the data packet processing type.

In subsequent embodiments, an example in which the first request message is a PDU session establishment request message is mainly used for description.

S404: The SMF network element obtains session subscription information from the UDM network element.

The UDM network element gives authorization, based on the configuration information in S401 and S402, to verify whether the terminal device is allowed to use the APP to perform the requested data packet processing.

The SMF network element performs session granularity authentication and authorization.

S405: The SMF network element obtains session policy information from the PCF network element, to implement session policy authorization.

S406: Complete establishment of a user plane path between the terminal device, a (R)AN, and a UPF network element.

The establishment of the user plane path implements establishment of a differentiated path for data packet transmission, and implement differentiated configuration for data packet processing.

S403 to S406 is considered as a process in which the control plane network element supports differentiated processing on the data packet.

S407: The terminal device sends the first data packet to the UPF network element.

Optionally, the first data packet carries the first indication information.

In S407, transmission of the first data packet on the differentiated path is implemented.

S408: The UPF network element processes the first data packet.

The UPF network element performs corresponding processing (for example, synchronous transmission, packet discard, statistics or statistics-free, and charging or charging-free) on the first data packet based on the first indication information, to implement differentiated processing at the data packet granularity.

The following describes in detail control procedures corresponding to different data packet processing types.

Figure 5A:
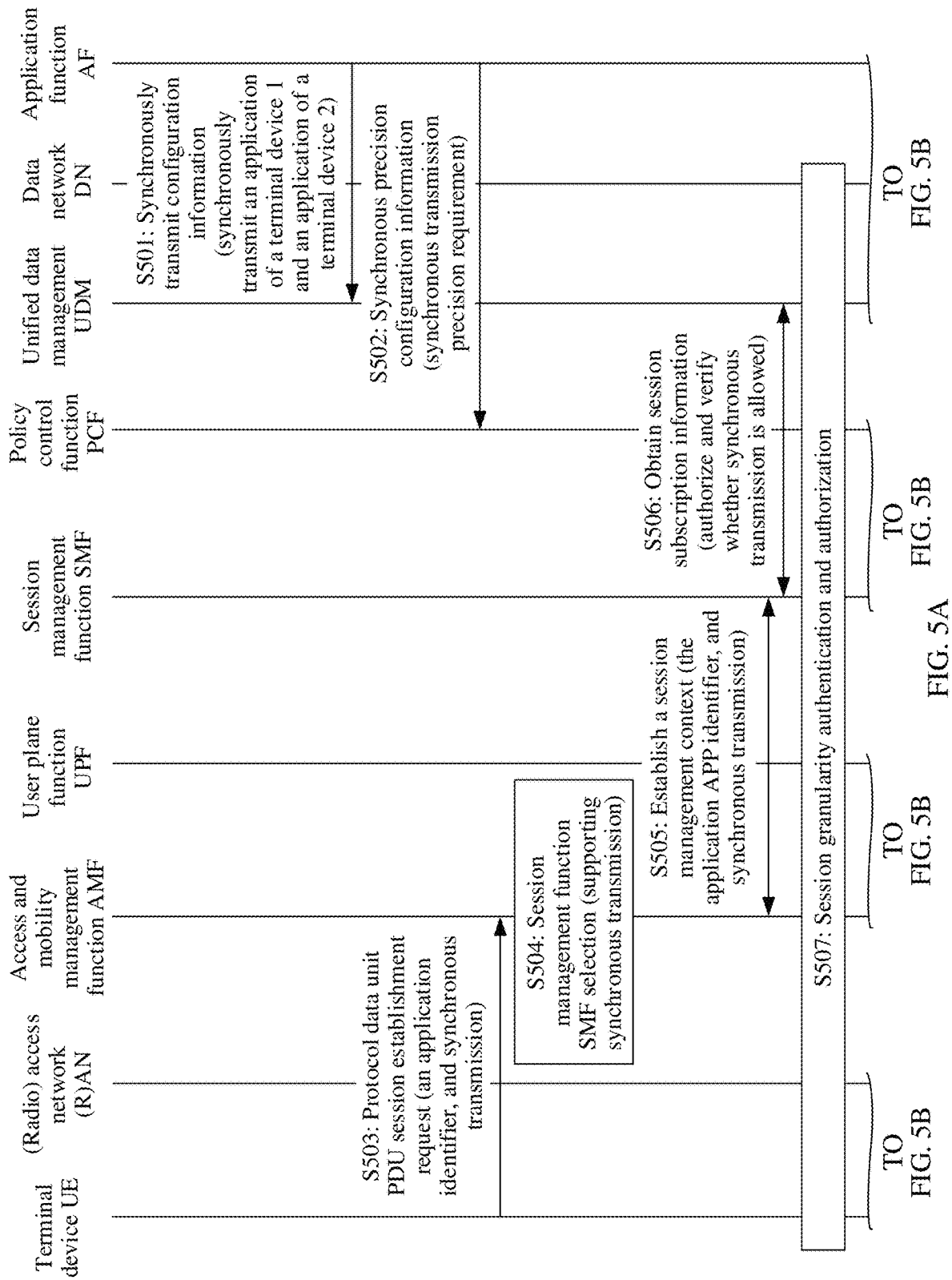
Figure 5B:
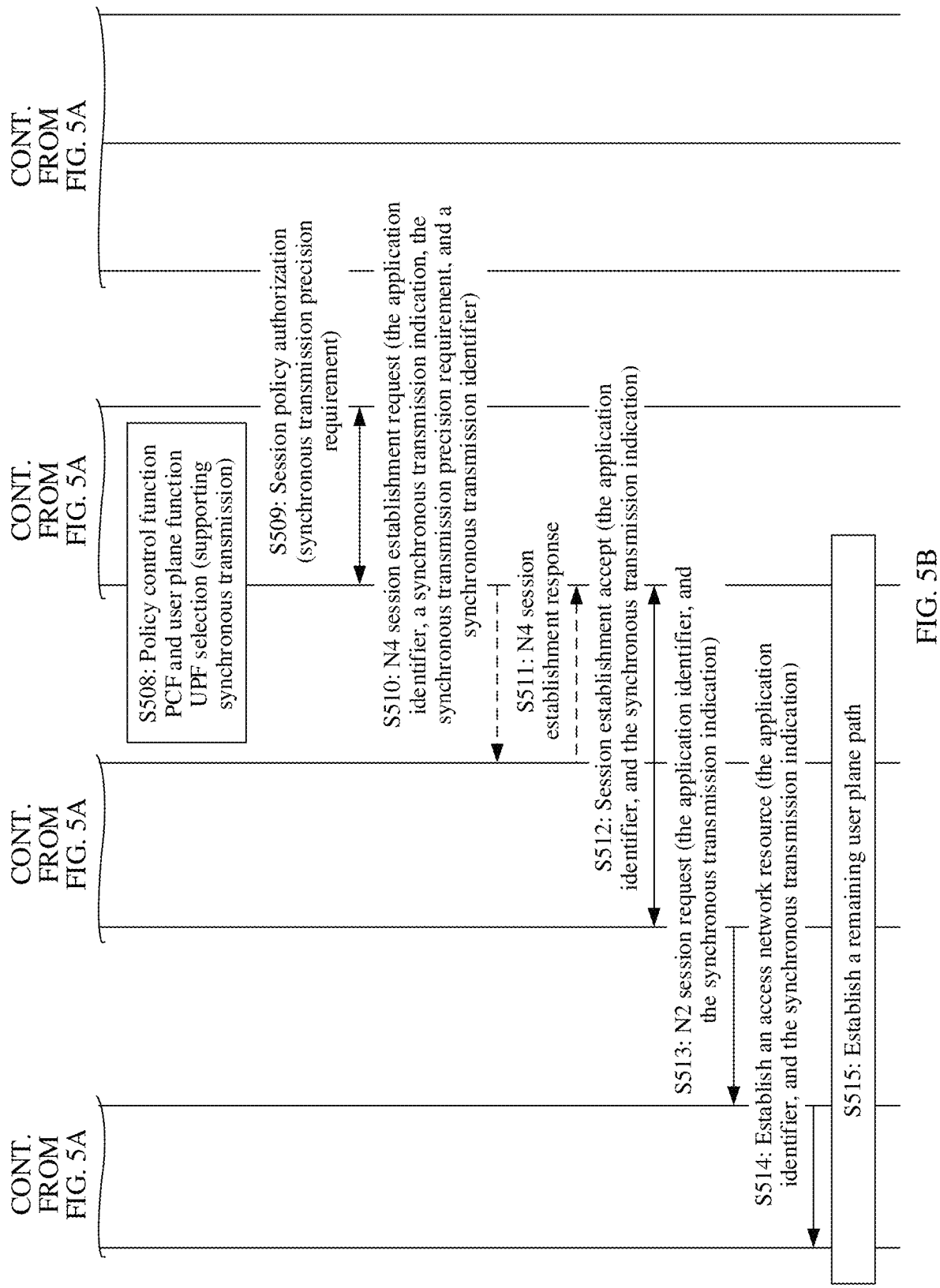

In response to the data packet processing type including synchronous transmission. To be specific, synchronous transmission is performed on the data packets in the plurality of data flows. At least one embodiment provides a control procedure for synchronous transmission of a plurality of data flows. As shown in FIG. 5A and FIG. 5B, the procedure includes the following process.

FIG. 5A and FIG. 5B shows synchronous transmission between a terminal device 1 and a terminal device 2. A control procedure of the terminal device 1 is mainly used as an example, and a control procedure of the terminal device 2 is similar to the control procedure of the terminal device 1, and repeated parts are not described again.

S501: An AF network element sends synchronous transmission configuration information to a UDM network element.

The AF network element configures, in a subscribed terminal device, an APP of a terminal device that needs to transmit uplink synchronous data. For example, the synchronous transmission configuration information indicates that an APP 1 of the terminal device 1 and an APP 2 of the terminal device 2 need to transmit the uplink synchronous data.

The APP 1 represents identification information of an APP that is in the terminal device 1 and that needs to transmit the uplink synchronous data, and the APP 2 represents identifier information of an APP that is in the terminal device 2 and that needs to transmit the uplink synchronous data. The identification information of the APP is represented by using a triplet, where the triplet includes a destination address, a destination port number, and a protocol type.

S502: The AF network element sends synchronous precision configuration information to a PCF network element.

The synchronous precision configuration information indicates a synchronous transmission precision requirement. The synchronous transmission precision condition is not limited in at least one embodiment. For example, the synchronous transmission precision condition is 99%.

S503: The terminal device sends a PDU session establishment request message. An AMF network element receives the PDU session establishment request message.

Optionally, the PDU session establishment request message carries the APP 1 (to be specific, the identification information of the APP that is in the terminal device 1 and that needs to transmit the uplink synchronous data) and a data packet processing type of synchronous transmission: or the PDU session establishment request message carries the APP 2 and a data packet processing type of synchronous transmission.

S504: The AMF network element selects an SMF network element, where the SMF network element selected by the AMF network element supports synchronous transmission.

Whether the SMF network element supports synchronous transmission is determined by a hardware feature of the SMF network element.

S505: Establish a PDU session management context between the AMF network element and the (selected) SMF network element.

Optionally, the AMF network element sends the APP 1 and the data packet processing type of synchronous transmission to the SMF network element: or the AMF network element sends the APP 2 and the data packet processing type of synchronous transmission to the SMF network element.

S506: The SMF network element obtains session subscription information from the UDM network element.

The session subscription information indicates that the APP 1 and the APP 2 are allowed to perform synchronous transmission.

The UDM network element authorizes and verifies, based on the configuration information in S501 and S502, whether the terminal device 1 is allowed to use the APP 1 to perform synchronous transmission. In response to authorizing and verifying that the APP 1 performs synchronous transmission, the UDM network element sends the indication information "indicating that the APP 1 and the APP 2 are allowed to perform synchronous transmission" to the SMF network element. Alternatively, the UDM network element authorizes and verifies, based on configuration information in S501 and S502, whether the terminal device 2 is allowed to use the APP 2 to perform synchronous transmission. In response to authorizing and verifying that the APP 2 performs synchronous transmission, the UDM network element sends the indication information "indicating that the APP 1 and the APP 2 are allowed to perform synchronous transmission" to the SMF network element.

The indication information "indicating that the APP 1 and the APP 2 are allowed to perform synchronous transmission" includes identification information of the terminal device 1, the APP 1, identification information of the terminal device 2, the APP 2, and synchronous transmission indication information.

S507: The SMF network element performs PDU session granularity authentication and authorization.

S508: The SMF network element selects the PCF network element and a UPF network element, where the PFC network element and the UPF network element that are selected by the SMF network element support synchronous transmission.

Whether a PFC network element supports synchronous transmission is determined by a hardware feature of the PFC network element, and whether the UPF network element supports synchronous transmission is determined by a hardware feature of the UPF network element.

S509: The SMF network element obtains session policy information from the PCF network element, to implement session policy authorization.

The session policy information indicates that a synchronous transmission precision condition between the APP 1 and the APP 2 is 99%.

S510: The SMF network element sends an N4 session establishment request to the UPF network element.

The N4 session establishment request indicates the UPF network element to perform synchronous transmission on a data packet of the APP 1 (or the APP 2).

The N4 session establishment request includes the APP 1, the synchronous transmission indication information, the synchronous transmission precision requirement, and a synchronous transmission ID allocated by the SMF network element for the APP 1. Alternatively, the N4 session establishment request includes the APP 2, the synchronous transmission indication information, the synchronous transmission precision requirement, and a synchronous transmission ID allocated by the SMF network element for the APP 2. Because synchronous transmission is performed between the APP 1 and the APP 2, the synchronous transmission ID allocated for the APP 1 is the same as or associated with the synchronous transmission ID allocated for the APP 2.

In this case, an internet protocol (IP) address of the terminal device 1 or an IP address of the terminal device 2 is already allocated, the identification information of the APP is represented by using a quadruplet, and the quadruplet includes the destination address, the destination port number, the protocol type, and an IP address of the terminal device.

S511: The UPF network element returns an N4 session establishment response.

S512: The SMF network element sends a session establishment accept (for example, Namf_Communication_N1N2MessageTransfer) to the AMF network element.

The session establishment accept includes the APP 1 (or the APP 2) and the synchronous transmission indication information.

S513: The AMF network element sends an N2 PDU session request message to a (R)AN. In other words, the AMF network element notifies the (R)AN to establish a radio bearer.

The N2 PDU session request message includes a NAS message, and the NAS message includes the APP 1 (or the APP 2) and the synchronous transmission indication information.

S514: Establish an access network resource between the (R)AN and the terminal device.

An access network resource establishment message is the NAS message, and the NAS message includes the APP 1 (or the APP 2) and the synchronous transmission indication information.

Synchronous transmission of the terminal device is successfully established.

S515: Establish a remaining user plane path between the terminal device, the (R)AN, and the UPF network element.

Figure 6:
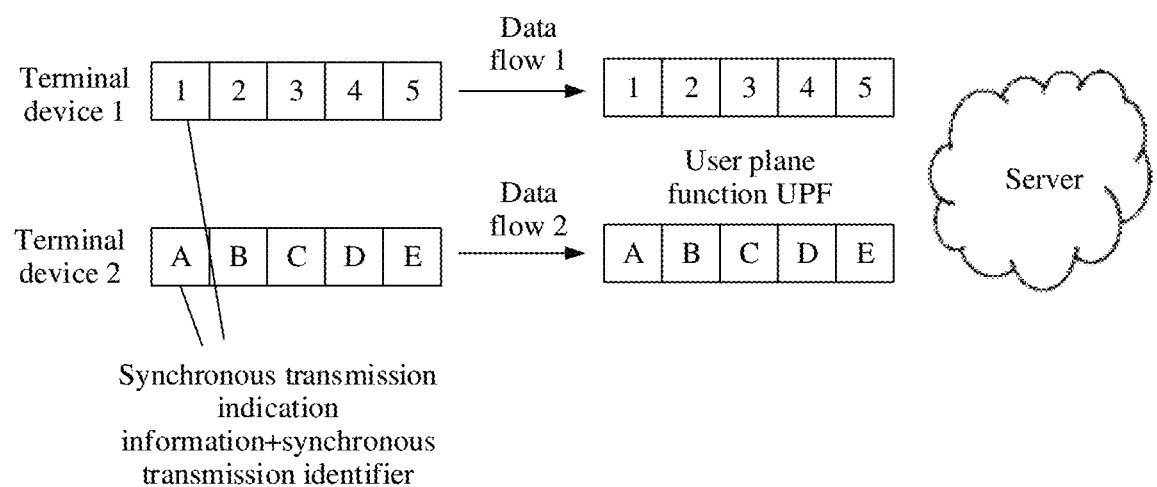
FIG. 6, FIG. 9, FIG. 11, and FIG. 14 each are a schematic diagram of a communication procedure according to at least one embodiment.
Figure 7:
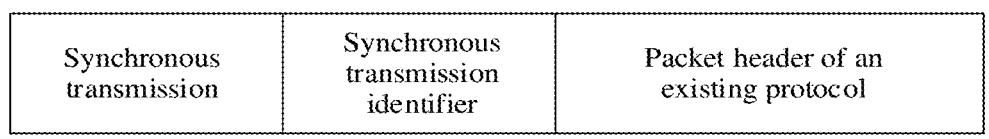

After a user plane path of the terminal device is established, as shown in FIG. 6, a data flow 1 generated by the terminal device 1 includes a data packet 1, a data packet 2, a data packet 3, a data packet 4, and a data packet 5, and each data packet includes the synchronous transmission indication information and a synchronous transmission ID. The terminal device 1 sequentially sends the data packets in the data flow 1 to the (R)AN, and the (R)AN sequentially sends the data packets in the data flow 1 to the UPF network element. A structure of the data packet 1 is shown in FIG. 7. The data packet processing type includes synchronous transmission, and a parameter required for data packet processing includes the synchronous transmission identifier ID. For example, the data packet 1 includes Command:[Action: Synchronize transmission, flag 0x0001].

Figure 8A:
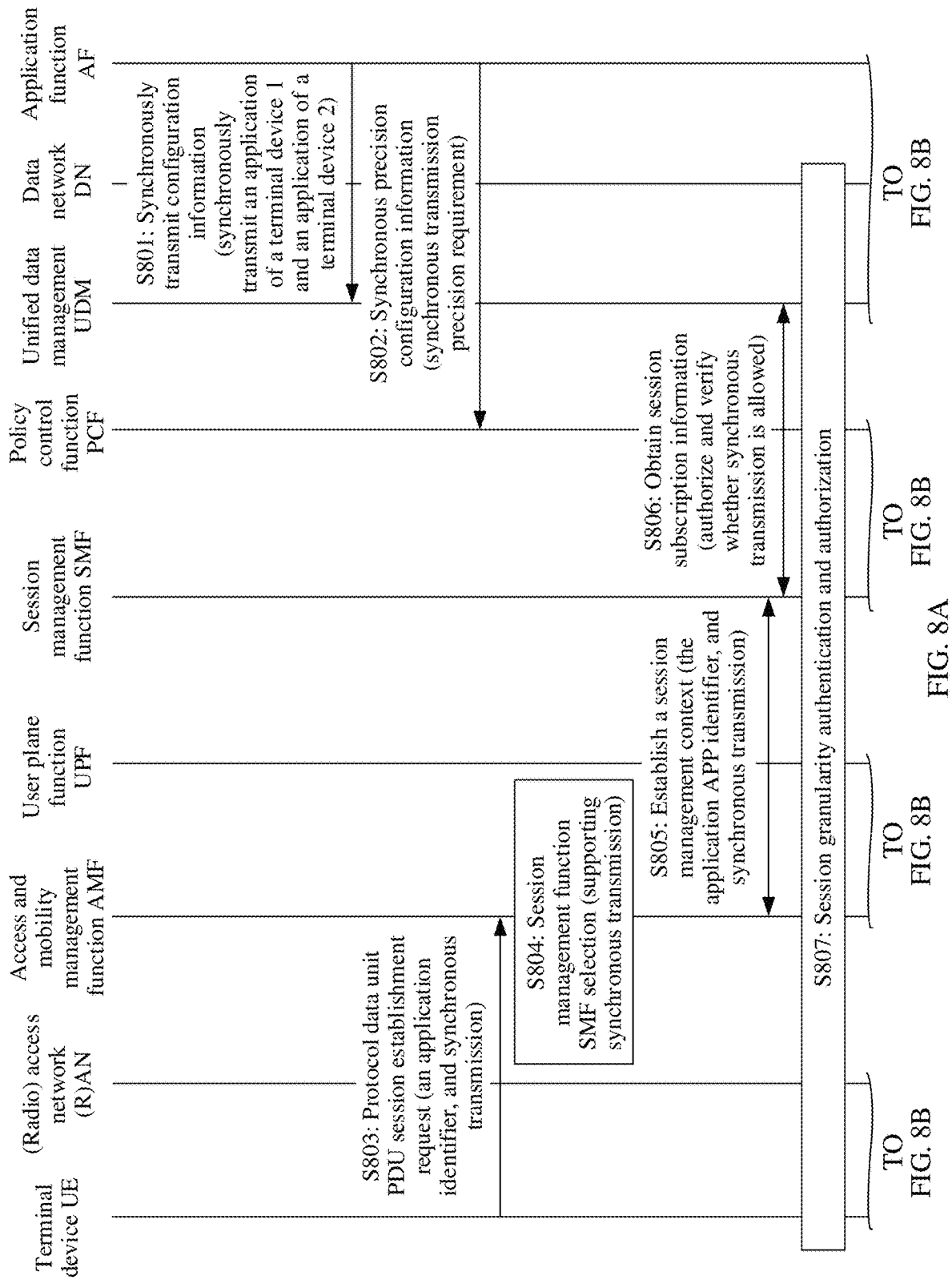
Figure 8B:
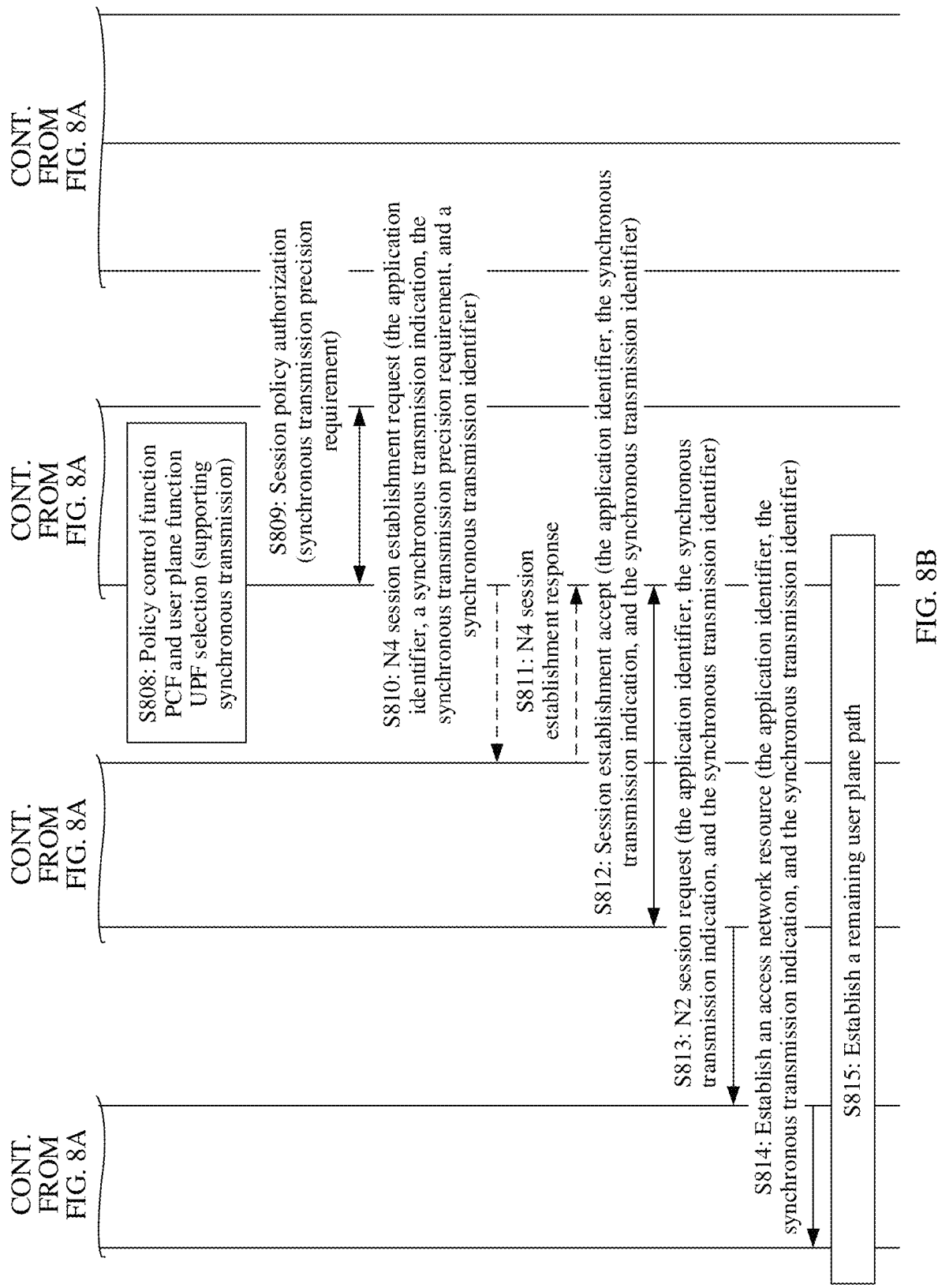

A data flow 2 generated by the terminal device 2 includes a data packet A, a data packet B, a data packet C, a data packet D, and a data packet E, and each data packet includes the synchronous transmission indication information and the synchronous transmission ID. The terminal device 2 sequentially sends the data packets in the data flow 2 to the (R)AN, and the (R)AN sequentially sends the data packets in the data flow 2 to the UPF network element. A structure of the data packet A is also shown in FIG. 8A and FIG. 8B. The data packet processing type includes synchronous transmission, and a parameter required for data packet processing includes the synchronous transmission ID. For example, the data packet A includes Command:[Action: Synchronize transmission, flag 0x0001].

The UPF network element receives the data packets in the data flow 1 and the data packets in the data flow 2. The UPF network element identifies, based on the synchronous transmission IDs carried in the data packets, data flows to which the data packets belong that need to be synchronously transmitted. In addition, the UPF network element further determines a plurality of data packets that carry a same synchronous transmission ID and that have same (or close) receiving time as data packets that need to be synchronously transmitted, and synchronously transmit the plurality of data packets. For example, the UPF network element synchronously transmits the data packet 1 and the data packet A to a server, and synchronously transmits the data packet 2 and the data packet B to the server until all data packets in the data flow 1 and the data flow 2 are synchronously transmitted.

Optionally, the UPF network element performs statistics on a data packet that performs synchronous transmission, and complete corresponding charging work with a user service charging system (online charging system/offline charging system, OCS/OFCS).

As shown in FIG. 8A and FIG. 8B, the control procedure for synchronous transmission of the plurality of data flows alternatively includes the following steps.

For a process of S801 to S811, refer to the foregoing process of S501 to S511. Details are not described herein again.

S812: The SMF network element sends a session establishment accept (for example, Namf_Communication_N1N2MessageTransfer) to the AMF network element.

The session establishment accept includes the APP 1 (or the APP 2), the synchronous transmission indication information, and a synchronous transmission ID.

S813: The AMF network element sends an N2 PDU session request message to a (R)AN. In other words, the AMF network element notifies the (R)AN to establish a radio bearer.

The N2 PDU session request message includes a NAS message, and the NAS message includes the APP 1 (or the APP 2), the synchronous transmission indication information, and the synchronous transmission ID.

S814: Establish an access network resource between the (R)AN and the terminal device.

An access network resource establishment message is the NAS message, and the NAS message includes the APP 1 (or the APP 2), the synchronous transmission indication information, and the synchronous transmission ID.

Synchronous transmission of the terminal device is successfully established.

For a process of S815, refer to the foregoing process of S515. Details are not described herein again.

Figure 9:
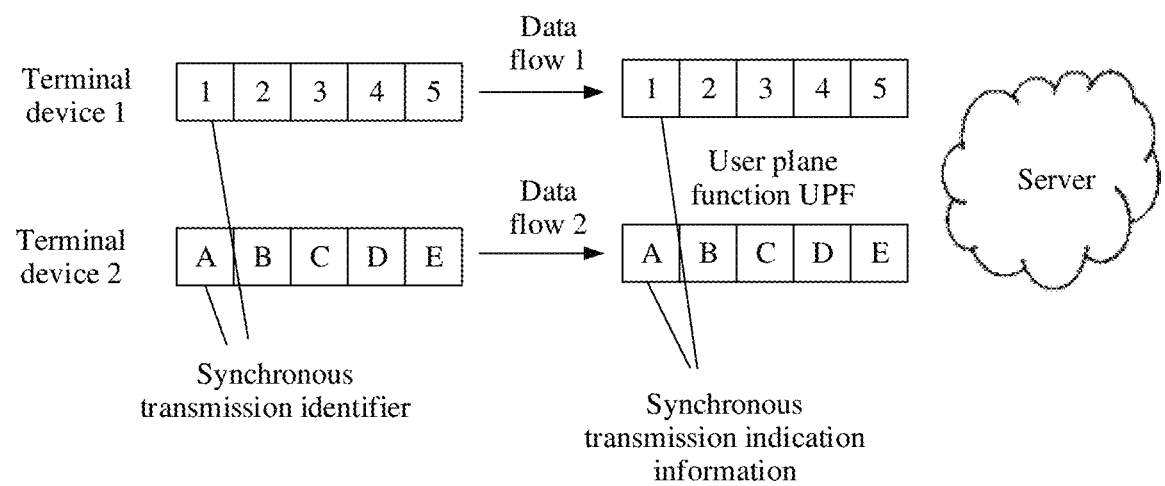

After a user plane path of the terminal device is established, as shown in FIG. 9, a data flow 1 generated by the terminal device 1 includes a data packet 1, a data packet 2, a data packet 3, a data packet 4, and a data packet 5, and each data packet includes the synchronous transmission ID. The terminal device 1 sequentially sends the data packets in the data flow 1 to the (R)AN. A data flow 2 generated by the terminal device 2 includes a data packet A, a data packet B, a data packet C, a data packet D, and a data packet E, and each data packet includes the synchronous transmission ID. The terminal device 2 sequentially sends the data packets in the data flow 2 to the (R)AN.

The (R)AN receives the data packet, and determines, based on a plurality of data packets that carry a same synchronous transmission ID and that have same (or close) receiving time, that the plurality of data packets are data packets that need to be synchronously transmitted. Then, the (R)AN sequentially adds the synchronous transmission indication information to the received data packets (for example, adds information included in command to the data packets) based on a time sequence of receiving the data packets, and sends, to the UPF network element each time after adding the synchronous transmission indication information to the data packets, data packets that carry the "synchronous transmission indication information". For an operation of the UPF network element, refer to FIG. 5A and FIG. 5B. Details are not described herein again.

Figure 10A:
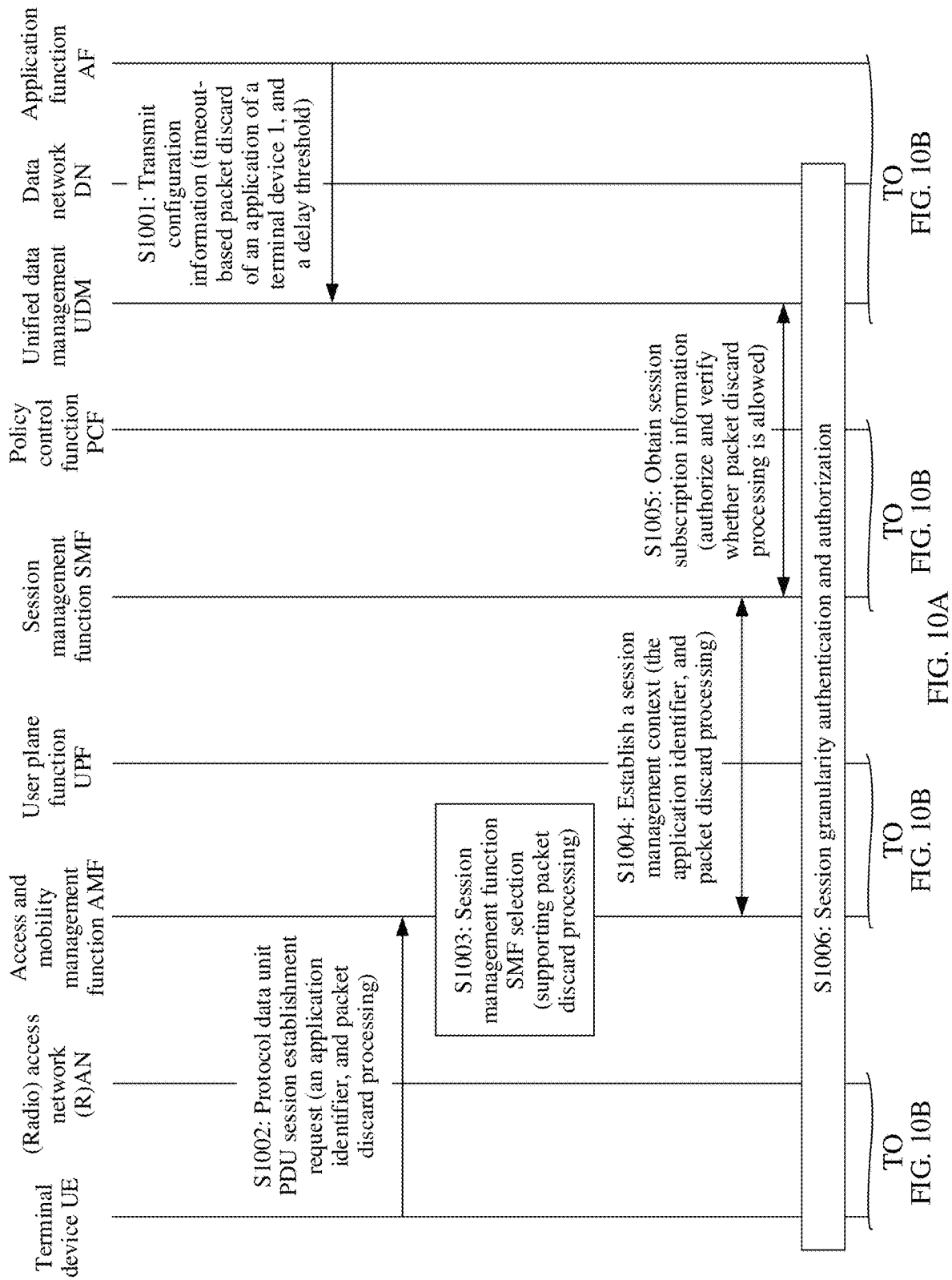

In response to the data packet processing type including (timeout-based) packet discard processing, to be specific, discards a packet whose transmission duration exceeds the delay threshold in the data flow. At least one embodiment proposes a timeout-based data packet discard control procedure. As shown in FIG. 10A and FIG. 10B, the procedure includes the following process.

S1001: An AF network element sends transmission configuration information to a UDM network element.

The AF network element configures, in a subscribed terminal device, an APP of a terminal device that is allowed to perform timeout-based packet discard processing, for example, is applied to area of interest (AoI) processing in a game scenario. The transmission configuration information indicates that an APP 1 of a terminal device 1 is allowed to perform timeout-based packet discard processing, and a delay threshold is 10 ms.

S1002: The terminal device sends a PDU session establishment request message. An AMF network element receives the PDU session establishment request message.

Optionally, the PDU session establishment request message carries the APP 1 (to be specific, identification information of an APP that is in the terminal device 1 and that needs to transmit uplink synchronous data) and a data packet processing type of (timeout-based) packet discard processing; or the PDU session establishment request message carries an APP 2 and a data packet processing type of (timeout-based) packet discard processing.

S1003: The AMF network element selects an SMF network element, where the SMF network element selected by the AMF network element supports (timeout-based) packet discard processing.

S1004: Establish a PDU session management context between the AMF network element and the SMF network element.

Optionally, the AMF network element sends the APP 1 and the data packet processing type of (timeout-based) packet discard processing to the SMF network element: or
the AMF network element sends the APP 2 and the data packet processing type of (timeout-based) packet discard processing to the SMF network element.

S1005: The SMF network element obtains session subscription information from the UDM network element.

The session subscription information indicates that the APP 1 performs (timeout-based) packet discard processing.

The UDM network element authorizes and verifies, based on the configuration information in S1001, whether the terminal device 1 is allowed to use the APP 1 to perform (timeout-based) packet discard processing. In response to authorizing and verifying that the APP 1 performs (timeout-based) packet discard processing, the UDM network element sends indication information "indicating that the APP 1 is allowed to perform (timeout-based) packet discard processing" to the SMF network element.

The indication information "indicating that the APP 1 is allowed to perform (timeout-based) packet discard processing" includes identification information of the terminal device 1, the APP 1, (timeout-based) packet discard processing indication information, and the delay threshold.

S1006: The SMF network element performs PDU session granularity authentication and authorization.

S1007: The SMF network element selects a PCF network element and a UPF network element, where a PFC network element and the UPF network element that are selected by the SMF network element support (timeout-based) packet discard processing.

S1008: The SMF network element obtains session policy information from the PCF network element, to implement session policy authorization.

S1009: The SMF network element sends an N4 session establishment request to the UPF network element.

The N4 session establishment request indicates the UPF network element to perform (timeout-based) packet discard processing on a data packet of the APP 1.

The N4 session establishment request includes the APP 1, the (timeout-based) data packet discard indication information, and the delay threshold.

In this case, an IP address of the terminal device 1 is already allocated, the identification information of the APP is represented by using a quadruplet, and the quadruplet includes a destination address, a destination port number, a protocol type, and an IP address of the terminal device.

S1010: The UPF network element returns an N4 session establishment response.

S1011: The SMF network element sends a session establishment accept (for example, Namf_Communication_NIN2MessageTransfer) to the AMF network element.

The session establishment accept includes the APP 1 and the (timeout-based) packet discard indication information.

S1012: The AMF network element sends an N2 PDU session request message to a (R)AN. In other words, the AMF network element notifies the (R)AN to establish a radio bearer.

The N2 PDU session request message includes a NAS message, and the NAS message includes the APP 1 and the (timeout-based) packet discard indication information.

S1013: Establish an access network resource between the (R)AN and the terminal device.

An access network resource establishment message is the NAS message, and the NAS message includes the APP 1 and the (timeout-based) packet discard indication information.

A (timeout-based) packet discard processing request of the terminal device succeeds.

S1014: Establish a remaining user plane path between the terminal device, the (R)AN, and the UPF network element.

Figure 11:
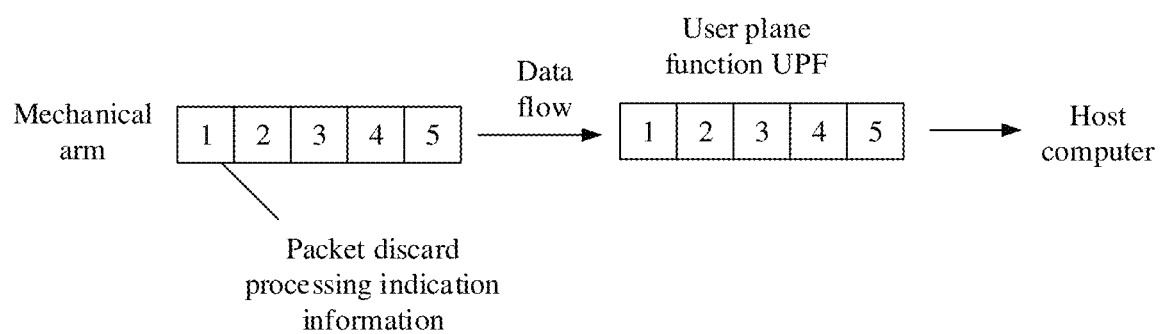
Figure 12:
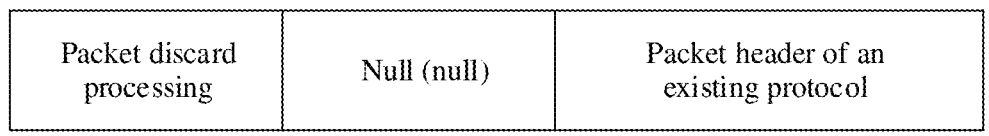

After a user plane path of the terminal device is established, as shown in FIG. 11, a data flow generated by a mechanical arm includes a data packet 1, a data packet 2, a data packet 3, a data packet 4, and a data packet 5, and each data packet includes the (timeout-based) packet discard indication information. The mechanical arm sequentially sends the data packets in the data flow to the (R)AN, and the (R)AN sequentially sends the data packets in the data flow to the UPF network element. A structure of the data packet 1 is shown in FIG. 12. The data packet processing type includes (timeout-based) packet discard processing, and a parameter required for data packet processing includes null. For example, the data packet 1 includes Command:[Action: Drop].

The UPF network element adds a timestamp at which the data packet is received to the data packet, and performs statistics on transmission duration of the data packet. In response to the transmission duration of the data packet exceeds the delay threshold, the UPF network element performs packet discard processing on the data packet. The UPF network element further sends the data packet to a host computer.

Not all data packets generated by the APP 1 have a packet discard requirement, and the UPF network element performs timeout-based packet discard processing only on a data packet that carries Command (to be specific, indicating the data packet processing type of packet discard processing). For example, real-time posture data of the mechanical arm has the (timeout-based) packet discard requirement, but other data (for example, temperature information or a power status of the mechanical arm) does not require strong real-time performance. Therefore, this type of data does not use (timeout-based) packet discard processing.

Figure 13A:
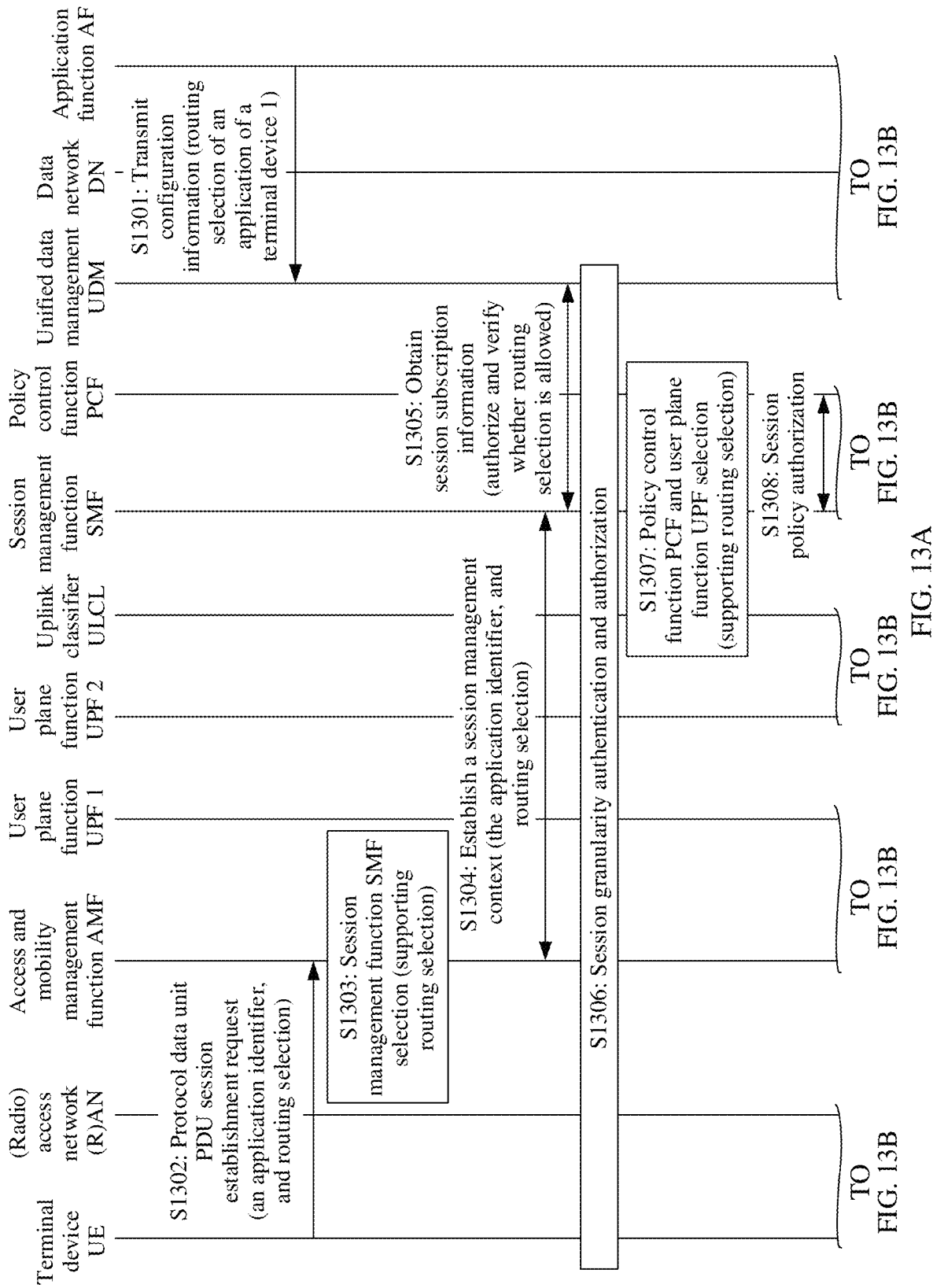

In response to the data packet processing type including routing selection (which is also referred to as differentiated routing or offloading processing), at least one embodiment proposes a control procedure of routing selection. As shown in FIG. 13A and FIG. 13B, the following process is included.

S1301: An AF network element sends transmission configuration information to a UDM network element.

The AF network element configures, in a subscribed terminal device, an APP of a terminal device that is allowed to perform routing selection. For example, the transmission configuration information indicates that an APP 1 of a terminal device 1 is allowed to perform routing selection.

S1302: The terminal device sends a PDU session establishment request message. An AMF network element receives the PDU session establishment request message.

Optionally, the PDU session establishment request message carries the APP 1 and a data packet processing type of routing processing.

S1303: The AMF network element selects an SMF network element, where the SMF network element selected by the AMF network element supports routing selection.

Whether the SMF network element supports routing selection is determined by a hardware feature of the SMF network element.

S1304: Establish a PDU session management context between the AMF network element and the SMF network element.

Optionally, the AMF network element sends the APP 1 and the data packet processing type of routing selection to the SMF network element.

S1305: The SMF network element obtains session subscription information from the UDM network element.

The session subscription information indicates that the APP 1 is allowed to perform routing selection.

The UDM network element authorizes and verifies, based on the configuration information in S1301, whether the terminal device 1 is allowed to use the APP 1 to perform routing selection. In response to authorizing and verifying that the APP 1 performs routing selection, the UDM sends network element indication information "indicating that the APP 1 is allowed to perform routing selection" to the SMF network element.

S1306: The SMF network element performs PDU session granularity authentication and authorization.

S1307: The SMF network element selects a PCF network element and a UPF network element, where the PFC network element and the UPF network element that are selected by the SMF network element support routing selection.

Whether a PFC network element supports routing selection is determined by a hardware feature of the PFC network element, and whether the UPF network element supports routing selection is determined by a hardware feature of the UPF network element.

S1308: The SMF network element obtains session policy information from the PCF network element, to implement session policy authorization.

S1309: The SMF network element sends an N4 session establishment request to the UPF network element.

The N4 session establishment request indicates the UPF network element to perform routing selection on a data packet of the APP 1.

The N4 session establishment request includes the APP 1 and routing selection indication information.

S1310: The UPF network element returns an N4 session establishment response.

S1311: The SMF network element sends a session establishment accept (for example, Namf_Communication_NIN2MessageTransfer) to the AMF network element.

The session establishment accept includes the APP 1 and the routing selection indication information.

S1312: The AMF network element sends an N2 PDU session request message to a (R)AN. In other words, the AMF network element notifies the (R)AN to establish a radio bearer.

The N2 PDU session request message includes a NAS message, and the NAS message includes the APP 1 and the routing selection indication information.

S1313: Establish an access network resource between the (R)AN and the terminal device.

An access network resource establishment message is the NAS message, and the NAS message includes the APP 1 and the routing selection indication information.

S1314: The SMF network element sends an N4 session establishment request message to a ULCL. In other words, an AMF network element notifies the ULCL of a traffic forwarding rule.

The N4 session establishment request message includes the APP 1, indication information about computing-delay-sensitive data, and corresponding path indication information; and/or the N4 session establishment request message includes the APP 1, indication information about computing-delay-tolerant data, and corresponding path indication information. The corresponding path indication information is ULCL path indication information or PDU session anchor (PSA) path indication information.

S1315: The ULCL returns an N4 session establishment response.

S1316: The SMF network element updates uplink and downlink data transmission paths of a PSA 1.

The PSA 1 (or an edge computing node connected to the PSA 1) is configured to process the computing-delay-tolerant data.

S1317: The SMF network element updates uplink and downlink data transmission paths of a PSA 2.

The PSA 2 (or an edge computing node connected to the PSA 2) is configured to process the computing-delay-sensitive data.

S1318: The PSA 1 sends downlink data to the ULCL, and the ULCL sends the downlink data to the terminal device; and/or the PSA 2 sends downlink data to the ULCL, and the ULCL sends the downlink data to the terminal device.

S1318 is an optional step.

S1319: The SMF network element updates an uplink data transmission path of the (R)AN.

S1320: The terminal device sends a data packet of a "computing-delay-tolerant data" type to the ULCL, and the ULCL sends the data packet to the PSA 1; and/or the terminal device sends a data packet of a "computing-delay-tolerant data" type to the ULCL, and the ULCL sends the data packet to the PSA 2.

In the embodiment shown in FIG. 13A and FIG. 13B, an offloading function of the ULCL is used to perform routing selection on different data packets in one data flow, so that a mobile edge computing (MEC) node connected to an offloaded PSA 2 processes the computing-delay-sensitive data, and an MEC node that is connected to an offloaded PSA 1 processes the computing-delay-tolerant data.

Figure 14:
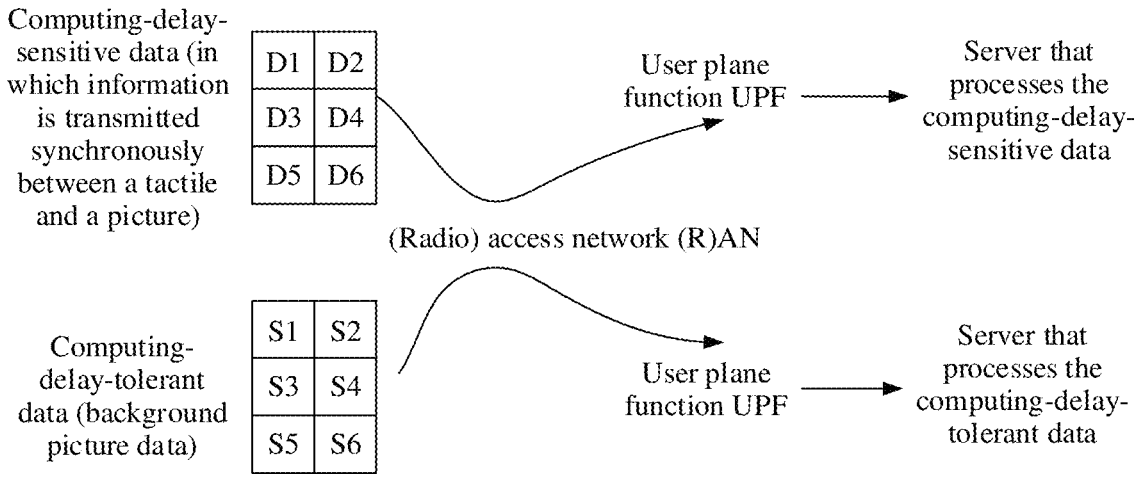
Figure 15:
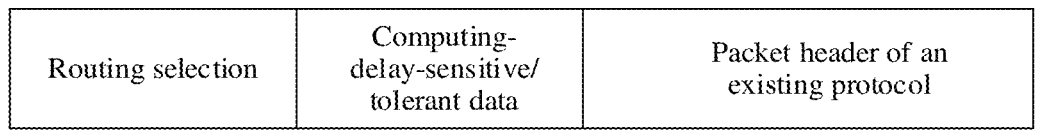

As shown in FIG. 14, a data flow generated by the terminal device 1 includes a data packet D1, a data packet D2, a data packet D3, a data packet D4, a data packet D5, and a data packet D6 of the computing-delay-sensitive data type. For example, the computing-delay-sensitive data is related information about synchronous transmission of a tactile and a picture. The terminal device 1 sends, by using a computing-delay-sensitive data transmission path, a data packet in the data flow to an MEC node connected to the UPF network element, where the MEC node is a server configured to process the computing-delay-sensitive data. A structure of the data packet is shown in FIG. 15. The data packet processing type includes routing selection, and a parameter required for data packet processing includes the computing-delay-sensitive data or the computing-delay-tolerant data.

The data flow generated by the terminal device 1 includes a data packet S1, a data packet S2, a data packet S3, a data packet S4, a data packet S5, and a data packet S6 of the computing-delay-tolerant data type. For example, the computing-delay-tolerant data is related information about background picture data. The terminal device 1 sends, by using a computing-delay-tolerant data transmission path, a data packet in the data flow to an MEC node connected to the UPF, where the MEC node is a server configured to process the computing-delay-tolerant data.

(Timeout-based) packet discard shown in FIG. 10A and FIG. 10B is alternatively replaced with another operation, for example, improving or reducing QoS of the data packet, or improving or reducing a priority of the data packet. That is, the control procedure shown in FIG. 10A and FIG. 10B is also applicable to a data packet processing type of improving or reducing the priority, or improving or reducing QoS.

For example, in response to transmission duration of a received data packet exceeding the delay threshold, the UPF network element increases a transmission priority of the data packet, or improves QoS of transmission of the data packet. In response to network congestion occurring, the UPF network element improves a transmission priority of the received data packet. In other words, the UPF preferably transmits the data packet.

For another example, in response to the data packet sent by the terminal device carrying data type indication information, and the data type indication information indicates that a video frame type of the data packet is an I-frame, a P-frame, or a B-frame, the data packet does not carry information included in command. QoS guarantee provided by the UPF network element for a data packet of the I-frame is higher than QoS guarantee provided for a data packet of the P-frame or the B-frame. In response to network congestion occurring, the UPF network element reserves the data packet of the I-frame, and discard the data packet of the P-frame or the B-frame.

Figure 16:
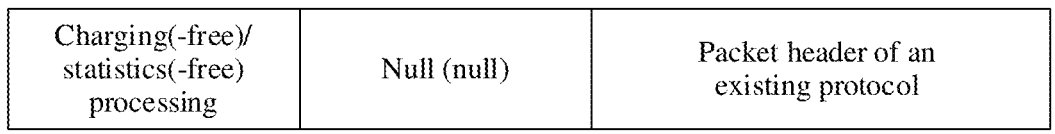

Alternatively, (timeout-based) packet discard shown in FIG. 10A and FIG. 10B is replaced with another operation, for example, statistics or statistics-free processing, or charging or charging-free processing. That is, the control procedure shown in FIG. 10A and FIG. 10B is also applicable to statistics or statistics-free processing, or charging or charging-free processing. For example, in response to the received data packet carrying "statistics", the UPF network element performs statistics on the data packet (where a statistics rule is agreed upon in advance or separately indicated); and in response to the received data packet carrying "statistics-free", the UPF network element does not perform statistics on the data packet. In response to the received data packet carrying "charging", the UPF network element performs charging on the data packet (where a charging rule is agreed upon in advance or separately indicated); and in response to the received data packet carrying "charging-free", the UPF network element does not perform charging on the data packet. A structure of the data packet is shown in FIG. 16. The data packet processing type includes (free of) charging/(free of) statistics processing, and a parameter required for data packet processing includes null.

The foregoing describes the communication method in at least one embodiment, and the following describes a communication apparatus in at least one embodiment. The method and the apparatus are based on a same technical idea. The method and the apparatus have similar principles for resolving problems. Therefore, for implementations of the apparatus and the method, refer to each other, and details of repeated parts are not described again.

Figure 17:
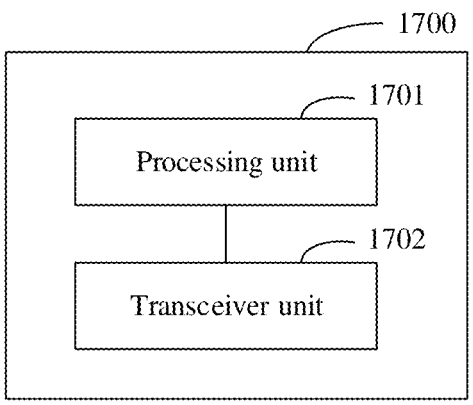
FIG. 17 and FIG. 18 each are a schematic diagram of a communication apparatus according to at least one embodiment.

Based on the same technical idea as the foregoing communication method, as shown in FIG. 17, a communication apparatus 1700 is provided. The communication apparatus 1700 includes a processing unit 1701 and a transceiver unit 1702. The apparatus 1700 is configured to implement the method described in the foregoing method embodiments applied to the user plane network element, the terminal device, or the control plane network element.

In an embodiment, the apparatus 1700 is applied to a user plane network element.

Specifically, the transceiver unit 1702 is configured to receive a first data packet, where the first data packet carries first indication information.

The processing unit 1701 is configured to process the first data packet based on the first indication information.

The first indication information includes one or more of the following: synchronous transmission indication information, packet discard indication information, data type indication information, charging indication information, statistics indication information, or priority indication information.

In an implementation, in response to the first indication information including the synchronous transmission indication information, the processing unit 1701 is specifically configured to synchronously transmit the first data packet and at least one second data packet by using the transceiver unit 1702, where synchronous transmission indication information carried in the at least one second data packet is associated with the synchronous transmission indication information carried in the first data packet.

In an implementation, in response to the first indication information including the packet discard indication information, the processing unit 1701 is specifically configured to discard the first data packet based on the packet discard indication information in response to network congestion occurring: or after the first data packet is received, discard the first data packet based on the packet discard indication information in response to identifying that transmission duration of the first data packet exceeds a delay threshold, where the delay threshold is received by a first user plane network element from a first control plane network element or the first data packet carries the delay threshold.

In an implementation, the first indication information includes the data type indication information, the data type indication information indicates a video frame type of the first data packet, and the video frame type includes one or more of the following: an I-frame, a P-frame, or a B-frame.

Quality of service QoS guarantee provided by the first user plane network element for a data packet whose video frame type is the I-frame is higher than QoS guarantee provided for a data packet whose video frame type is the P-frame or the B-frame.

In an implementation, in response to the first indication information including the charging indication information, the processing unit 1701 is specifically configured to execute, for the first data packet, a charging rule indicated by the charging indication information.

In an implementation, in response to the first indication information including the statistics indication information, the processing unit 1701 is specifically configured to execute, for the first data packet, a statistics rule indicated by the statistics indication information.

In an implementation, in response to the first indication information including the priority indication information, and the priority indication information includes a high priority, the processing unit 1701 is specifically configured to: transmit the first data packet by using the transceiver unit 1702 in response to network congestion occurring: or after the first data packet is received, improve QoS guarantee of the first data packet in response to identifying that the transmission duration of the first data packet exceeds the delay threshold.

In an implementation, the first data packet includes a first field, the first field includes the first indication information, the first indication information indicates a data packet processing type and/or a parameter required for data processing, and the first field indicates the first user plane network element to process the first data packet.

In an implementation, the transceiver unit 1702 is further configured to: before the processing the first data packet based on the first indication information, receive first configuration information from the first control plane network element, where the first configuration information includes one or more of the following: the synchronous transmission indication information, the packet discard indication information, the data type indication information, the charging indication information, the statistics indication information, or the priority indication information.

The processing unit 1701 is specifically configured to: in response to a data packet processing type indicated by the first indication information being associated with the data packet processing type indicated by the first configuration information, process the first data packet based on the first indication information.

In an implementation, the first configuration information includes the synchronous transmission indication information, and the transceiver unit 1702 is further configured to receive a first synchronous transmission identifier and/or a synchronous transmission precision requirement, where the first synchronous transmission identifier indicates the first user plane network element to perform synchronous transmission on a data packet that carries a synchronous transmission identifier associated with the first synchronous transmission identifier.

In another embodiment, the apparatus 1700 is used in a terminal device.

Specifically, the processing unit 1701 is configured to generate a first data packet, where the first data packet carries first indication information.

The transceiver unit 1702 is configured to send the first data packet.

The first indication information includes one or more of the following: synchronous transmission indication information, packet discard indication information, data type indication information, charging indication information, statistics indication information, or priority indication information.

In an implementation, the transceiver unit 1702 is further configured to: before the generating a first data packet, receive second configuration information from a first control plane network element, where the second configuration information includes one or more of the following: synchronous transmission indication information, packet discard indication information, data type indication information, charging indication information, statistics indication information, or priority indication information.

In an implementation, the transceiver unit 1702 is further configured to send a first request message, where the first request message requests to establish a session, the first request message includes information about a data packet processing type and/or identification information corresponding to a data flow, and the identification information corresponding to the data flow requests to process a data packet in a data flow of the identification information.

In an implementation, the second configuration information includes the synchronous transmission indication information, and the transceiver unit 1702 is further configured to receive a first synchronous transmission identifier, where the first synchronous transmission identifier indicates a first user plane network element to perform synchronous transmission on a data packet that carries a synchronous transmission identifier associated with the first synchronous transmission identifier.

In an implementation, the first data packet includes a first field, the first field includes the first indication information, the first indication information indicates the data packet processing type and/or a parameter required for data processing, and the first field indicates the first user plane network element to process the first data packet.

In still another embodiment, the apparatus 1700 is applied to a control plane network element.

Specifically, the processing unit 1701 is configured to deliver configuration information by using the transceiver unit 1702, where the configuration information includes one or more of the following: synchronous transmission indication information, packet discard indication information, data type indication information, charging indication information, statistics indication information, or priority indication information.

In an implementation, the transceiver unit 1702 is further configured to: before the delivering configuration information, receive a first request message, where the first request message requests to establish a session, a first request includes information about a data packet processing type and/or identification information corresponding to a data flow, and the identification information corresponding to the data flow requests to process a data packet in a data flow of the identification information.

The processing unit 1701 is configured to select, based on information about the data packet processing type, a first user plane network element that has a processing capability required for the data packet processing type.

The transceiver unit 1702 is specifically configured to deliver the configuration information to the first user plane network element.

In an implementation, the data packet processing type includes one or more of the following: synchronous transmission, packet discard processing, routing selection, charging or charging-free processing, statistics or statistics-free processing, improving or reducing a priority, or improving or reducing QoS.

In an implementation, the data packet processing type includes synchronous transmission, and the processing unit 1701 is further configured to allocate a first synchronous transmission identifier based on a synchronous transmission type and the identification information corresponding to the data flow.

In an implementation, the transceiver unit 1702 is further configured to send the first synchronous transmission identifier and/or a synchronous transmission precision requirement.

In an implementation, the data packet processing type includes packet discard processing, and the transceiver unit 1702 is further configured to send a delay threshold.

In an implementation, the processing unit 1701 is further configured to: before the delivering configuration information, authorize to perform a requested data packet processing type on the data packet in the data flow of the identification information.

In at least one embodiment, division into modules is an example, and is only a logical function division. During actual implementation, there is another division manner. In addition, functional units in at least one embodiment are integrated into one processing unit, or exist alone physically, or two or more units are integrated into one unit. The integrated unit is implemented in a form of hardware, or is implemented in a form of a software functional unit.

In response to the integrated unit being implemented in the form of the software functional unit and sold or used as an independent product, the integrated unit is stored in a computer-readable storage medium. Based on such an understanding, the technical solutions of at least one embodiment essentially, or the part contributing to the conventional technology, or all or some of the technical solutions is implemented in a form of a software product. The computer software product is stored in a storage medium, and includes several instructions for instructing a computer device (which is a personal computer, a server, a network device, or the like) or a processor to perform all or some of the steps of the methods described in at least one embodiment. The foregoing storage medium includes any medium that stores program code, such as a USB flash drive, a removable hard disk, a read-only memory (ROM), a random access memory (RAM), a magnetic disk, or an optical disc.

Figure 18:
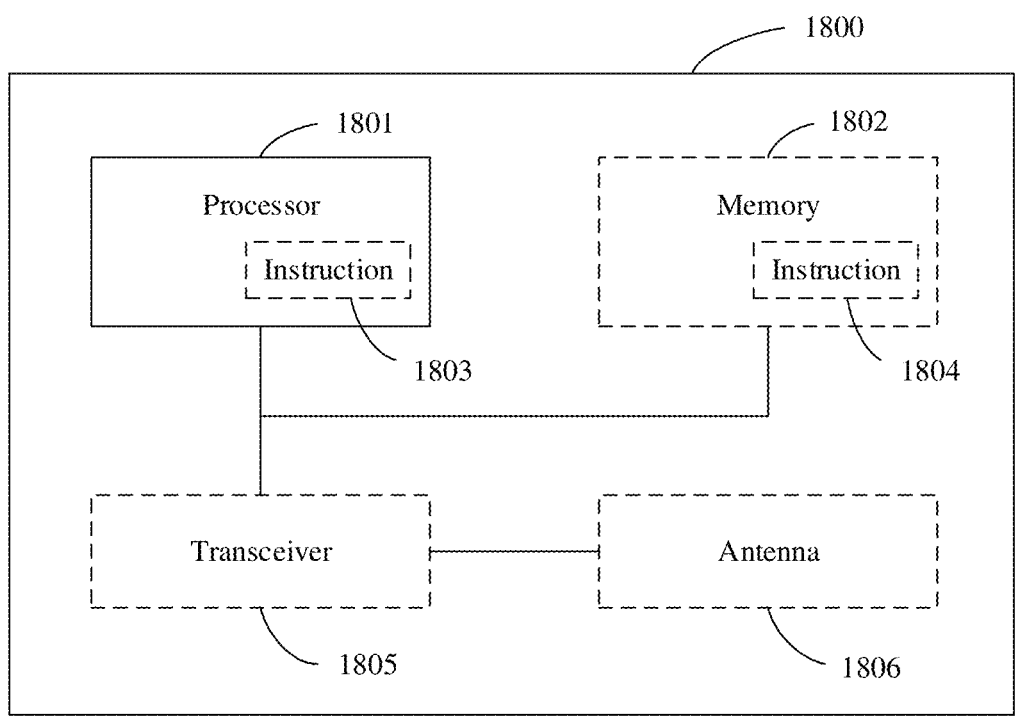

Based on the same technical idea as the foregoing communication method, as shown in FIG. 18, at least one embodiment further provides a schematic diagram of a structure of a communication apparatus 1800. The apparatus 1800 is configured to implement the method described in the foregoing method embodiments applied to the user plane network element, the terminal device, or the control plane network element. For details, refer to the descriptions in the foregoing method embodiments. The apparatus 1800 is located in a user plane network element, a terminal device, or a control plane network element, or is a user plane network element, a terminal device, or a control plane network element.

The apparatus 1800 includes one or more processors 1801. The processor 1801 is a general purpose processor, a dedicated processor, or the like. For example, the processor is a baseband processor or a central processing unit. The baseband processor is configured to process a communication protocol and communication data. The central processing unit is configured to: control a communication apparatus (for example, a base station, a terminal, or a chip), execute a software program, and process data of the software program. The communication apparatus includes a transceiver unit, configured to input (receive) and output (send) a signal. For example, the transceiver unit is a transceiver or a radio frequency chip.

The apparatus 1800 includes one or more processors 1801. The one or more processors 1801 implements the method of the user plane network element, the terminal device, or the control plane network element in the foregoing embodiments.

Optionally, the processor 1801 further implements another function in addition to the method in the foregoing embodiments.

Optionally, in a design, the processor 1801 executes instructions, so that the apparatus 1800 performs the method described in the foregoing method embodiments. All or some of the instructions, for example, instructions 1803, is stored in the processor, or all or some of the instructions, for example, instructions 1804, is stored in a memory 1802 coupled to the processor. Alternatively, the apparatus 1800 is enabled, by using both the instructions 1803 and the instructions 1804, to perform the method described in the foregoing method embodiments.

In at least one embodiment, the communication apparatus 1800 alternatively includes a circuit, and the circuit implements a function of the user plane network element, the terminal device, or the control plane network element in the foregoing method embodiments.

In at least one embodiment, the apparatus 1800 includes one or more memories 1802. The memory stores instructions 1804, and the instructions is run on the processor, the apparatus 1800 is enabled to perform the method described in the foregoing method embodiments. Optionally, the memory further stores data. Optionally, the processor alternatively stores instructions and/or data. For example, the one or more memories 1802 store the correspondence described in the foregoing embodiments, or the related parameter or table in the foregoing embodiments. The processor and the memory is separately disposed, or is integrated together.

In at least one embodiment, the apparatus 1800 further includes a transceiver 1805 and an antenna 1806. The processor 1801 is referred to as a processing unit, and controls the apparatus (a terminal or a base station). The transceiver 1805 is referred to as a transceiver, a transceiver circuit, the transceiver unit, or the like, and is configured to implement a transceiver function of the apparatus by using the antenna 1806.

The processor in at least one embodiment is an integrated circuit chip, and has a signal processing capability. In an implementation process, the steps in the foregoing method embodiments is completed by using a hardware integrated logic circuit in the processor or instructions in a form of software. The foregoing processor is a general purpose processor, a digital signal processor (DSP), an application-specific integrated circuit (ASIC), a field programmable gate array (FPGA) or another programmable logic device, a discrete gate or transistor logic device, or a discrete hardware component. The processor implements or perform the methods, the steps, and logical block diagrams that are disclosed in at least one embodiment. The general-purpose processor is a microprocessor, or the processor is any conventional processor or the like. Steps of the methods disclosed with reference to at least one embodiment is directly executed and accomplished by a hardware decoding processor, or is executed and accomplished by using a combination of hardware and software modules in the decoding processor. A software module is located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in at least one embodiment is a volatile memory or a nonvolatile memory, or includes a volatile memory and a nonvolatile memory. The nonvolatile memory is a read-only memory (ROM), a programmable read-only memory (PROM), an erasable programmable read-only memory (EPROM), an electrically erasable programmable read-only memory (EEPROM), or a flash memory. The volatile memory is a random access memory (RAM), used as an external cache. By way of example but not limitation, many forms of RAMs is used, for example, a static random access memory (static RAM, SRAM), a dynamic random access memory (DRAM), a synchronous dynamic random access memory (SDRAM), a double data rate synchronous dynamic random access memory DDR SDRAM), an enhanced synchronous dynamic random access memory (ESDRAM), a synchlink dynamic random access memory (SLDRAM), and a direct rambus dynamic random access memory (DR RAM). The memory in the system and the method described in this specification is intended to include, but not limited to, these memories and any memory of another proper type.

At least one embodiment further provides a computer-readable medium. The computer-readable medium stores a computer program. In response to the computer program being executed by a computer, the communication method according to any one of the method embodiments applied to the user plane network element, the terminal device, or the control plane network element is implemented.

At least one embodiment further provides a computer program product. In response to the computer program product being executed by a computer, the communication method according to any one of the method embodiments applied to the user plane network element, the terminal device, or the control plane network element is implemented.

At least one embodiment further provides a communication system. The communication system includes the user plane network element and the terminal device that perform the foregoing communication methods, and further includes the control plane network element.

All or some of the foregoing embodiments is implemented by using software, hardware, firmware, or any combination thereof. In response to the software being used to implement the foregoing embodiments, all or some of the foregoing embodiments is implemented in a form of a computer program product. The computer program product includes one or more computer instructions. In response to the computer instructions being loaded and executed on the computer, the procedure or functions according to at least one embodiment are all or partially generated. The computer is a general-purpose computer, a dedicated computer, a computer network, or other programmable apparatuses. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)), or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a high-density digital video disc (DVD)), a semiconductor medium (for example, a solid-state drive (SSD)), or the like.

At least one embodiment further provides a processing apparatus, including a processor and an interface. The processor is configured to perform the communication method according to any one of the method embodiments applied to the user plane network element, the terminal device, or the control plane network element.

In at least one embodiment, the processing apparatus is a chip. The processor is implemented by hardware, or is implemented by software. In response to the processor being implemented by the hardware, the processor is a logic circuit, an integrated circuit, or the like. In response to the processor being implemented by the software, the processor is a general-purpose processor. The general-purpose processor is implemented by reading software code stored in a memory. The memory is integrated into the processor, or is located outside the processor and exist independently.

A person of ordinary skill in the art is aware that, in combination with the examples described in embodiments disclosed in this specification, units and algorithm steps is implemented by electronic hardware, computer software, or a combination thereof. To clearly describe the interchangeability between the hardware and the software, the foregoing has generally described compositions and steps of each example according to functions. Whether the functions are performed by hardware or software depends on particular embodiments and design constraint conditions of the technical solutions. A person skilled in the art is able to use different methods to implement the described functions for embodiments described herein, but the implementation does not go beyond the scope of embodiments described herein.

For the purpose of convenient and brief description, for a detailed working process of the foregoing system, apparatus, and unit, refer to a corresponding process in the foregoing method embodiments, and details are not described herein again.

In the several embodiments disclosed herein, the disclosed system, apparatus, and method is implemented in other manners. For example, the described apparatus embodiment is only an example. For example, division into the units is only logical function division and is other division in actual implementation. For example, a plurality of units or components is combined or integrated into another system, or some features is ignored or not performed. In addition, the displayed or discussed mutual couplings or direct couplings or communication connections is implemented through some interfaces, indirect couplings or communication connections between the apparatuses or units, or electrical connections, mechanical connections, or connections in other forms.

The units described as separate parts may or may not be physically separate, and parts displayed as units may or may not be physical units, in other words, is located in one position, or is distributed on a plurality of network units. Some or all of the units is selected to achieve the objectives of the solutions of embodiments described herein.

In addition, function units in at least one embodiment is integrated into one processing unit, each of the units exists alone physically, or two or more units is integrated into one unit. The integrated unit is implemented in a form of hardware, or is implemented in a form of a software functional unit.

With descriptions of the foregoing implementations, a person skilled in the art clearly understands that at least one embodiment is implemented by hardware, firmware, or a combination thereof. In response to at least one embodiment being implemented by software, the foregoing functions is stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium is any available medium accessible to a computer. The following provides an example but does not impose a limitation: The computer-readable medium includes a RAM, a ROM, an EEPROM, a CD-ROM, or another optical disc storage or disk storage medium, another magnetic storage device, or any other medium that carries or stores expected program code in a form of an instruction or a data structure and is accessed by a computer. In addition, any connection is properly defined as a computer-readable medium. For example, in response to the software being transmitted from a website, a server, or another remote source by using a coaxial cable, an optical fiber/cable, a twisted pair, a digital subscriber line (DSL), or wireless technologies such as infrared ray, radio and microwave, the coaxial cable, optical fiber/cable, twisted pair, DSL, or wireless technologies such as infrared ray, radio, and microwave are included in fixation of a medium to which they belong. A disk and a disc used in at least one embodiment include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination is also included in the protection scope of the computer-readable medium.

In conclusion, the foregoing descriptions are only examples of embodiments of the technical solutions, but are not intended to limit the protection scope of embodiments described herein. Any modification, equivalent replacement, or improvement made without departing from the spirit and principle of embodiments described herein fall within the protection scope of the claims.

What is claimed is:

1. A communication method, comprising:
   receiving a first data packet, generated by a User Equipment (UE), carrying first indication information to control processing at a packet granularity; and
   processing the first data packet based on the first indication information including performing differentiated processing on the first data packet at the packet granularity based on information carried in the first indication information, wherein
   the first indication information comprises one or more of the following: synchronous transmission indication information, packet discard indication information, data type indication information, charging indication information, statistics indication information, or priority indication information.

2. The method according to claim 1, wherein the first indication information comprises the synchronous transmission indication information, and the processing the first data packet based on the first indication information comprises:
   synchronously transmitting the first data packet and at least one second data packet, wherein the at least one second data packet carrying second synchronous transmission indication information associated with the synchronous transmission indication information carried in the first data packet.

3. The method according to claim 2, wherein the synchronously transmitting the first data packet and the at least one second data packet includes synchronously transmitting the first data packet in a first data flow and the second data packet in a second data flow.

4. The method according to claim 1, wherein the first indication information comprises the packet discard indication information, and the processing the first data packet based on the first indication information comprises:
   discarding the first data packet based on the packet discard indication information in response to network congestion occurring; or
   after the first data packet is received, discarding the first data packet based on the packet discard indication information in response to the packet discard information identifying that a transmission duration of the first data packet exceeds a delay threshold, wherein the delay threshold is received from a first control plane network element or the first data packet carries the delay threshold.

5. The method according to claim 1, wherein the first indication information comprises the data type indication information, the data type indication information indicates a video frame type of the first data packet, and the video frame type comprises one or more of the following: an I-frame, a P-frame, or a B-frame; and a quality of service (QOS) guarantee provided for the first data packet, wherein the QoS guarantee of the I-frame is higher than the QoS guarantee of the P-frame or the B-frame.

6. The method according to claim 1, wherein the first indication information comprises the charging indication information, and the processing the first data packet based on the first indication information comprises:

executing, for the first data packet, a charging rule indicated by the charging indication information.

7. The method according to claim 1, wherein the first indication information comprises the statistics indication information, and the processing the first data packet based on the first indication information comprises:

executing, for the first data packet, a statistics rule indicated by the statistics indication information.

8. The method according to claim 1, wherein the first indication information comprises the priority indication information, the priority indication information comprises a high priority, and the processing the first data packet based on the first indication information comprises:

transmitting the first data packet when network congestion occurs; or after the first data packet is received, improving a QoS guarantee of the first data packet in response to the first data packet having a transmission duration exceeding a delay threshold.

9. The method according to claim 1, wherein the receiving the first data packet includes receiving a first data packet having a first field, the first field comprises the first indication information, the first indication information indicates a data packet processing type and/or a parameter required for data processing, and processing the first data packet includes processing the first data packet according to the first field.

10. The method according to claim 9, wherein the processing the first data packet includes processing the first data packet according to the data packet processing type, wherein the data packet processing type comprises one or more of the following: synchronous transmission, packet discard processing, routing selection, charging or charging-free processing, statistics or statistics-free processing, improving or reducing a priority, or improving or reducing QoS.

11. The method according to claim 9, wherein before the processing the first data packet based on the first indication information, the method further comprises:

receiving first configuration information from the first control plane network element, wherein the first configuration information comprises one or more of the following: the synchronous transmission indication information, the packet discard indication information, the data type indication information, the charging indication information, the statistics indication information, or the priority indication information; and the processing the first data packet based on the first indication information comprises:

in response to a data packet processing type indicated by the first indication information being associated with the data packet processing type indicated by the first configuration information, processing the first data packet based on the first indication information.

12. The method according to claim 11, wherein the receiving the first configuration information from the first control plane network element comprises receiving the synchronous transmission indication information, and the method further comprises:

receiving a first synchronous transmission identifier and/or a synchronous transmission precision requirement, wherein the first synchronous transmission identifier indicates to perform synchronous transmission on a data packet that carries a synchronous transmission identifier associated with the first synchronous transmission identifier.

13. The method according to claim 1, wherein the first indication information comprises the synchronous transmission indication information, the receiving the first data packet further including receiving, from an access network element, the first data packet carrying the synchronous transmission indication information and a second synchronous transmission identifier.

14. A communication method, comprising:

generating, by a User Equipment (UE), a first data packet, wherein the first data packet carries first indication information for controlling processing at a packet granularity; and sending the first data packet to a network element for processing the first data packet based on the first indication information, the first indication information is usable by the network element to perform differentiated processing on the first data packet at the packet granularity, wherein the first indication information comprises one or more of the following: synchronous transmission indication information, packet discard indication information, data type indication information, charging indication information, statistics indication information, or priority indication information.

15. The method according to claim 14, wherein the first indication information comprises the packet discard indication information and/or the priority indication information, and the first data packet further carries a delay threshold.

16. The method according to claim 14, wherein before the generating the first data packet, the method further comprises:

receiving second configuration information from a first control plane network element, wherein the second configuration information comprises one or more of the following: the synchronous transmission indication information, the packet discard indication information, the data type indication information, the charging indication information, the statistics indication information, or the priority indication information.

17. The method according to claim 16, further comprising:

sending a first request message, wherein the first request message comprises information about a data packet processing type and/or identification information corresponding to a data flow, and the identification information corresponding to data flow requests to process a data packet in the data flow associated with the identification information.

18. The method according to claim 16, wherein the receiving the second configuration information comprises receiving the synchronous transmission indication information, and the method further comprises:

receiving a first synchronous transmission identifier, wherein the first synchronous transmission identifier indicates to perform synchronous transmission on a data packet that carries a synchronous transmission identifier associated with the first synchronous transmission identifier.

19. The method according to claim 14, wherein the generating the first data packet comprises generating the first data packet with a first field, the first field comprises the first indication information, the first indication information indicates the data packet processing type and/or a parameter required for data processing, and the first field indicates to process the first data packet.

20. A communication apparatus, comprising
a memory storing computer program instructions; and
a processor configured to execute some or all computer program instructions to:
  receive a first data packet, generated by a User Equipment (UE), carrying first indication information to control processing at a packet granularity; and
  process the first data packet based on the first indication information including performing differentiated processing on the first data packet at the packet granularity based on information carried in the first indication information,
  wherein the first indication information includes one or more of the following: synchronous transmission indication information, packet discard indication information, data type indication information, charging indication information, statistics indication information, or priority indication information.

\* \* \* \* \*